(12) United States Patent
Liu et al.

(10) Patent No.: US 6,775,713 B1
(45) Date of Patent: *Aug. 10, 2004

(54) APPLICATION PROGRAM INTERFACE FOR ABSTRACTING CONTROL OF A CABLE MODEM

(75) Inventors: Jun Liu, Redmond, WA (US); John M. Parchem, Seattle, WA (US); Daniel J. Shoff, Issaquah, WA (US); Sureshkumar Natarajan, Bellevue, WA (US); Soemin Tjong, Redmond, WA (US)

(73) Assignee: WebTV Newtorks, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/371,419

(22) Filed: Aug. 10, 1999

Related U.S. Application Data

(60) Provisional application No. 60/122,859, filed on Mar. 4, 1999.

(51) Int. Cl.[7] .............................................. G06F 15/16
(52) U.S. Cl. ...................... 709/250; 719/321; 719/328; 370/401
(58) Field of Search ............................ 725/74, 78, 80, 725/85, 110, 111; 370/469, 401; 709/221, 250, 227, 239, 321, 324, 327, 328; 719/321, 328

(56) References Cited

U.S. PATENT DOCUMENTS

| | | | | |
|---|---|---|---|---|
| 5,809,252 A | * | 9/1998 | Beighe et al. | 709/227 |
| 5,867,666 A | * | 2/1999 | Harvey | 709/239 |
| 6,295,554 B1 | * | 9/2001 | Karadogan et al. | 709/219 |
| 6,421,728 B1 | * | 7/2002 | Mohammed et al. | 709/227 |
| 6,484,210 B1 | * | 11/2002 | Adriano et al. | 709/239 |

OTHER PUBLICATIONS

Cerf, V., "the Catenet Model for Internetworking," Information Processing Techniques Office, Defense Advanced Research Projects Agency, IEN 48, Jul. 1978.

Bolt Beranek and Newman, "Specification for the Interconnection of a Host and an IMP," BBN Technical Report 1822, Revised May 1978.

Postel, J., "Internet Control Message Protocol—DARPA Internet Program Protocol Specification," RFC 792, USC/Information Sciences Institute, Sep. 1981.

Shoch, J., "Inter–Network Naming, Addressing, and Routing," COMPCON, IEEE Computer Society, Fall 1978.

Postel, J., "Address Mappings", RFC 796, USC/Information Sciences Institute, Sep. 1981.

(List continued on next page.)

Primary Examiner—Dung C. Dinh
(74) Attorney, Agent, or Firm—Workman Nydegger

(57) ABSTRACT

Provided is a system and method for integrating a cable modem with a host customer premises equipment, such as a computer or set top box. An interface is provided which receives data packets from the cable modem of any manufacturer and transmits the data packet to a media access control layer. The media access control layer determines the destination of the data packet and forwards it to that destination, which may be the cable modem or may be the host computer of the cable modem or any other customer premises equipment networked with the host computer. The interface also receives data packets from the media access control layer and transmits the data packets to the cable modem for transmission upstream. The interface abstracts the control of the cable modem to the media access control layer. The system maintains a protocol stack for the cable modem that is separate from the protocol stack associated with the operating system of the host computer. The cable modem and the host computer are separately addressable by the cable network. Furthermore, the cable modem shares the processor and resources of the host computer.

48 Claims, 5 Drawing Sheets

OTHER PUBLICATIONS

Shoch, J., "Packet Fragmentation in Inter–Network Protocols," Computer Networks, v. 3, n. 1, Feb. 1979.

Strazisar, V., "How to Build a Gateway," IEN 109, Bolt Beranek and Newman, Aug. 1979.

Postel, J., "Service Mappings," RFC 795, USC/Information Sciences Institute, Sep. 1981.

Postel, J., "Assigned Numbers," RFC 790, USC/Information Sciences Institute, Sep. 1981.

"MCNS Data–Over–Cable Service Interface Specifications: Baseline Privacy Interface Specification SP–B–PI–I02–990319", Mar. 1999.

"MCNS Data–Over–Cable Service Interface Specifications: Cable Modem to Customer Premise Equipment Interface Specification SP–CMCI–I04–000714", Jul. 2000.

"Data–Over–Cable Service Interface Specifications: Cable Modem Termination System—Network Side Interface Specification, SP–CMTS–NSII01–960702", Jul. 1996.

Ciciora, W., et al., "Protocol Issues," *Modern Cable Television Technology: Video, Voice, and Data Communications*, Section 4.4, pp. 194–205, Copyright 1999 by Morgan Kaufmann Publishers, Inc.

Ciciora, W., et al, "Chapter 4.5: The DOCSIS Protocol for Cable Modems," *Modern Cable Television Technology: Video, Voice, and Data Communicatons*, Section 4.5, pp. 205–213, Copyright 1999 by Morgan Kaufmann Publishers, Inc.

* cited by examiner

APPLICATION PROGRAM INTERFACE FOR ABSTRACTING CONTROL OF A CABLE MODEM

RELATED APPLICATIONS

This application claims the benefit of U.S. Provisional Application No. 60/122,859, filed Mar. 4, 1999, which is incorporated herein by reference.

BACKGROUND OF THE INVENTION

1. The Field of the Invention

The present invention relates to cable modems. More specifically, the present invention relates to an interface between the physical layer and the data link layer of the cable modem protocol stack and to placing data on and retrieving data from a cable modem.

2. The Prior State of the Art

The Internet is a worldwide interconnection of networks over which computers can exchange information. Never before have human beings had access to so much information from the comfort of their own homes or offices. For Wide Area Networks (WANs) such as the Internet, a computer typically employs a modem to send information to and receive information from other connected computers. There are many types of modems each corresponding to a specific type of medium used to deliver this information.

One common modem uses Plain Old Telephone Service (POTS) to send and receive information. POTS modems have an advantage in that they use a transmission medium that is available by just connecting the modem with the nearest phone jack. Thus, the POTS modem does not require expensive capital investment to set up a connection to the Internet. Although POTS modems are easy and inexpensive to connect to the Internet, the transmission speeds available over plain old telephone service are relatively slow. Currently, POTS modems are capable of information exchange at up to only 56,000 bits per second (bps) or approximately 0.056 megabits per second (Mbps). While faster POTS modems may eventually become available, it is not currently anticipated that POTS modems can become significantly faster due to physical limitations in the telephone lines themselves.

Telephone companies are now offering services that bypass the relatively slow telephone lines to establish a more direct connection to the Internet. For example, T1 connections permit information exchange in the megabit per second range. T2 and T3 connections allow for even higher speed information exchange. Currently, T1, T2 and T3 connections respectively permit information exchange at approximately. 1.544 Mbps, 6.312 Mbps and 44.736 Mbps. Although these direct T1, T2 and T3 connections permit information exchange orders of magnitude faster than is available over plain old telephone service, they are typically much more expensive to obtain and/or maintain than plain old telephone service since each connection requires dedicated circuitry. Furthermore, telephone companies typically provide both the plain old telephone service and the T1, T2 and T3 connections. To facilitate free market competition, it would be desirable for a consumer to have alternative suppliers of Internet access.

A cable modem is a device that hooks up to the Internet through a cable system provided by a cable supplier. Assuming that the cable supplier facilitates Internet access as many cable suppliers are want to do, Internet access is obtained by plugging the cable modem into a cable connection that typically already exist (or may be readily installed) in many homes and business. Thus, the cost of connecting a cable modem to the Internet is relatively small compared to establishing T1, T2 and T3 connections since the extensive cable network that supports communication already exists. Thus, there is no need to establish extensive dedicated circuitry to support each new end user.

Furthermore, dialing into the Internet is not needed since data may be communicated to or from the end-user over the cable system without dialing into the cable system. A cable modem network is a connectionless system, whereas the telephone system is a connection oriented service. In a connectionless system, information is passed when information is available and the system resources are available to other users the rest of the time. In contrast, a connection oriented system sets up a connection which is set up and torn down for each communication. For instance, most internet users, when internet access is desired, must place a call to an Internet service provider to establish a connection. Once the connection is established, the user can access the internet. When the user is finished, the connection is terminated by hanging up. This is not the case with cable modems because a cable modem user has no need of dialing into an Internet service provider because the user appears to be connected at all times. The initial connection to the Internet is much faster compared to using plain old telephone service.

In addition, cable modems allow for much faster information exchange than is available over plain old telephone service. An individual cable modem end user may experience information exchange speeds of from 0.5 Mbps to 1.0 Mbps or more depending on the cable network architecture and traffic load. This represents a speed that is at least an order of magnitude faster than is currently available over plain old telephone service. Furthermore, cable information exchange speeds may be further increased due to future improvements in cable technology. Thus, cable modems provide a low cost, high-speed alternative for Internet access.

In a typical cable modem configuration, the cable modem is external to and separately addressable from the end user's computer system. The end user's computer is then connected to the cable modem using, for example, a network card. One reason for which the cable modem is external to the end-user's computer is that the cable modem may have access control settings that are to be set by the cable operator, not by the end-user. For example, the cable operator may want to prohibit access to certain services unless the end-user has communicated a subscription to the cable indicating a willingness to abide by certain terms. Allowing the end-user to directly access and set these access control settings would bypass the very purpose for having the access control settings. Thus, having the cable modem be external to the end-user's computer has the advantage of the cable operator retaining control of the access control settings within the cable modem.

Communication over a cable network using a cable modem is typically performed using a standard such as the well-known Data Over Cable Service Interface Specification (DOCSIS) 1.0 standard, which establishes uniform data transmission standards. The DOCSIS standard is managed by the Multimedia Cable Network System (MCNS), an organization formed by major cable operators.

Because the cable modem is external, the cable modem does not use the processing capability of the central processing unit (CPU) of the end user's computer. Also, the cable modem does not share memory with the end user's computer. Thus, the cable modem has its own CPU and memory which increases the cost of the cable modem.

Because the cable modem is typically external to an end user's computer or other equipment and because the cable modem has controls which are set by the company providing the cable service, the development of cable modems has not been uniform. This non-uniformity has been a roadblock to the integration and interoperability of cable modems with, for example, a computer or a set top box. There are computers or other equipment which provide a cable modem in the same box, but the computer and the cable modem are not truly integrated because the cable modem and the computer do not share the same processor or memory.

In would be an advancement in the art to integrate a cable modem with a computer or a set top box or other equipment. Additionally, it would be an advancement in the art to provide an interface such that a cable modem of any manufacturer can be used in a particular computer or set top box and can be used in more than one cable network. Thus, what is desired is a computer system that integrates a cable modem with customer premises equipment in a manner that preserves the advantages of an external cable modem, reduces cost and standardizes the transfer of data from the cable modem to the customer premises equipment.

SUMMARY AND OBJECTS OF THE INVENTION

The present invention provides for integrating a cable modem with a customer premises equipment in a system where, in a preferred embodiment, the cable modem and the customer premises equipment share a processor and resources. As used herein, the term "customer premises equipment" (CPE) refers to any electronic device, such as a computer, a set top box, or the like, that uses a cable modem to access network resources or communicate with other networked components.

Because a cable modem has typically been built as an external device related to computers, set top boxes and other equipment, manufacturers of cable modems have implemented cable modem protocol in varied manners when designing the cable modems. The present invention provides for integrating the cable modem with a CPE or a host, but the DOCSIS standard has not previously had any specifications for a cable modem that is integrated with a customer premises equipment (CPE) such as a computer or a set top box.

The protocol stack of a cable modem is related to the well-known open systems interconnection (OSI) model. The relevant layers include the physical layer (layer 1), the data link layer (layer 2), and the network layer (layer 3). The physical layer is primarily the hardware associated with the cable modem and the data link layer is typically represented by a media access controller layer. The network layer and higher layers essentially conform to standards of other networks and are not specific to cable modems.

The present invention defines an interface which serves to transfer data packets between the physical layer, which is represented by the cable modem, to a media access controller (MAC), which implements the data link layer. Because cable modems are not uniform, the present invention defines an interface to transfer the data packets between the cable modem and the MAC. In a sense, the interface, also referred to as the hardware abstraction layer, separates the functions of the hardware from the software. Thus, the interface performs a portion of the functions associated with each of physical layer and the data link layer. The interface permits cable modems to be used in any host computer having the hardware abstraction layer, so long as the cable modem complies with the requirements of the interface.

Through the interface, the media access controller controls the function of the cable modem. The interface handles the hardware specific functions of the media access controller and exports its services to the media access controller. In this manner, information can be transmitted, in a standardized method, from the cable modem to the media access controller. In addition, the hardware abstraction layer enables interoperability between various cable modems and host computers without the designers or manufacturers of the cable modems and host computers needing to understand the internal, and sometimes proprietary, features other components in the system.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
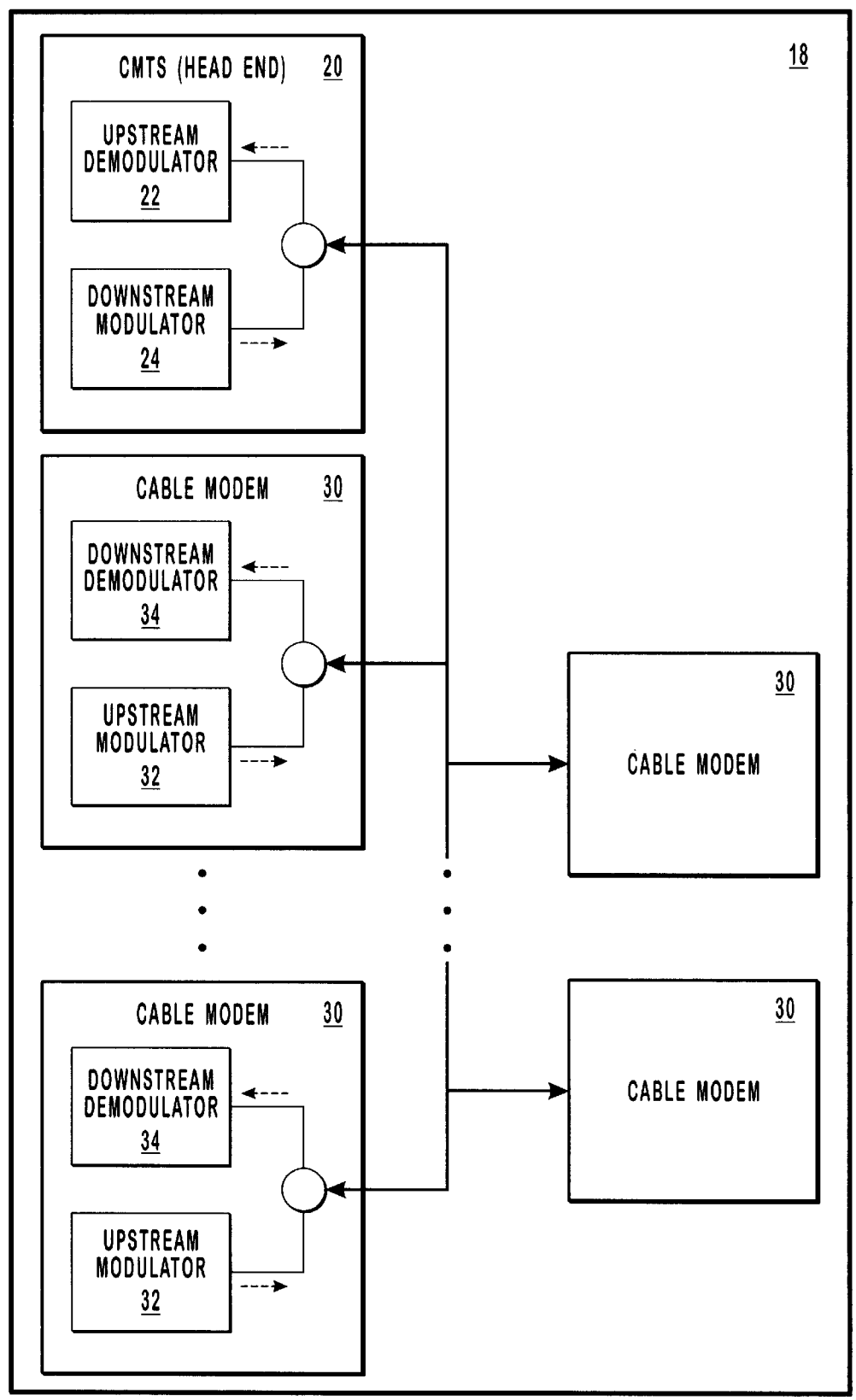
FIG. 1 is a block diagram illustrating transmission of data from a cable head end to any of a plurality of cable modems.

As an external device, a cable modem has its own processor, memory and protocol stack. This arrangement exists in part to ensure than an end user cannot alter the settings of the cable modem and receive services which have not been properly obtained. Also, an external modem is separately addressable from customer premises equipment and messages intended for the cable modem will not be received by the end user. Integration of a cable modem with a customer premises equipment is difficult in part because of these and other functions and advantages of an external cable modem.

The present invention provides for the integration of a cable modem and a customer premises equipment (CPE) such as a computer, a computer network, a set top box, or other equipment while maintaining the advantages of an external cable modem. The integration of a cable modem and a CPE indicates that the cable modem and the CPE will be bundled into a single device and will share both the resources and processor of the device and that the proprietary interest of the cable supplier in the function of the cable modem is protected.

While cable modems in general adhere to the DOCSIS protocol, the DOCSIS protocol does not address a situation where the cable modem and the customer premises equipment are integrated into a single unit or system. The present invention provides a cable modem driver which implements, as near as possible, the requirements of the DOCSIS protocol. To meet the requirements of DOCSIS, the CPE or host must provide for multiplexing the cable modem hardware and protocol stack with other internal clients as well as external clients. Thus the integrated CPE maintains a separate protocol stack for the cable modem, and the cable modem has a separate address. Further, precautions are taken to ensure that the CPE cannot change the parameters of the cable modem, thereby protecting the proprietary interest of the cable provider in the cable modem.

A primary responsibility of the cable modem driver is sending and receiving packets of data. When a packet arrives at the cable modem, the cable modem driver checks the packet to determine the destination of the packet. If the destination of the packet is one of the host computer or any other CPE networked with the host computer, the data packet is forwarded from the cable modem driver to the appropriate recipient via a virtual bridge. Because the cable modem is separately addressable from the host CPE, packets intended for the cable modem driver can be separated from data packets intended for the host computer and any other networked CPEs.

In order to successfully integrate a cable modem with a CPE and provide wide interoperability, it is desirable to overcome the non-uniformity of cable modems, while still conforming to DOCSIS specifications. This is accomplished according to the invention by providing an interface which separates the hardware of the cable modem from the software of the cable modem protocol stack. The interface is responsible for retrieving packets from the cable modem hardware and for placing packets from the cable modem driver or the CPE on the cable modem. The interface creates a standard that permits a cable modem to function with more than one type of host computer and further allows more than one type of cable modem to operate with any particular host computer so long as the cable modem appropriately presents the packet to the hardware abstraction layer interface.

The invention is described in terms of diagrams and flow charts. Using the diagrams and flow charts in this manner to present the invention should not be construed as limiting its scope. The embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer, such as one included in a set top box. When information is transferred or provided over a network or other communications connection to a computer, the computer properly, views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Although not required, the invention can be described in the general context of computer-executable instructions, such as program modules, being executed by one or more processors included in CPE. Generally, program modules include routines, programs, objects, components, data structures, etc. that perform particular tasks or implement particular abstract data types. Moreover, those skilled in the art will appreciate that the invention may be practiced with other computer system configurations, including general purpose computers, personal computers, hand-held devices, multi-processor systems, microprocessor-based or programmable consumer electronics, network PCs, minicomputers, mainframe computers, and the like.

FIG. 1 illustrates the general operation of cable modems in a typical cable network that supports transmission of data.

Cable Modem Termination System (CMTS) 20 provides service and is connected to one or more cable modems 30. CMTS 20 is also referred to as the head end of the system, and is typically operated and maintained by the cable operator. Cable network 18 illustrated in FIG. 1 is similar to a local area computer network (LAN), but the method of communication is distinct.

Communication in cable network 18 can occur either downstream or upstream. Downstream communication occurs from CMTS 20 to cable modem 30. CMTS 20 typically has a downstream modulator 24 which places the data or information in cable network 18. Cable modem 30 has a downstream demodulator 34 to retrieve the information placed in cable network 18. Upstream communication occurs from cable modem 30 to CMTS 20 in a similar manner. Cable modem 30 has an upstream modulator 32 to place the data or information in cable network 18 and CMTS 20 has an upstream demodulator 22 to retrieve the information from the cable network.

The downstream communication is from CMTS 20 to all cable modems 30, but the upstream communication is from a cable modem 30 to CMTS 20. In order for one cable modem to communication with another cable modem, the communication typically travels through CMTS 20. In the downstream direction, the data is modulated and placed, for example, on a channel having a 6 MHz bandwidth between the frequencies of 50 and 750 MHz. Another channel with a frequency typically between 5 to 42 MHz is utilized for upstream communication.

The cable system of FIG. 1 is typically designed to comply with the DOCSIS standard, which establishes a uniform protocol for transmitting data in cable networks, such that cable modems in one cable system will function in another cable system. The DOCSIS standard details a protocol between cable modem 30 and CMTS 20 as well as security in the cable system. However, cable modem implementation has usually been outside of a host device, or a customer premises equipment (CPE), and DOCSIS does not presently address host side implementation of a cable modem where the cable modem is integrated with the CPE.

Figure 2:
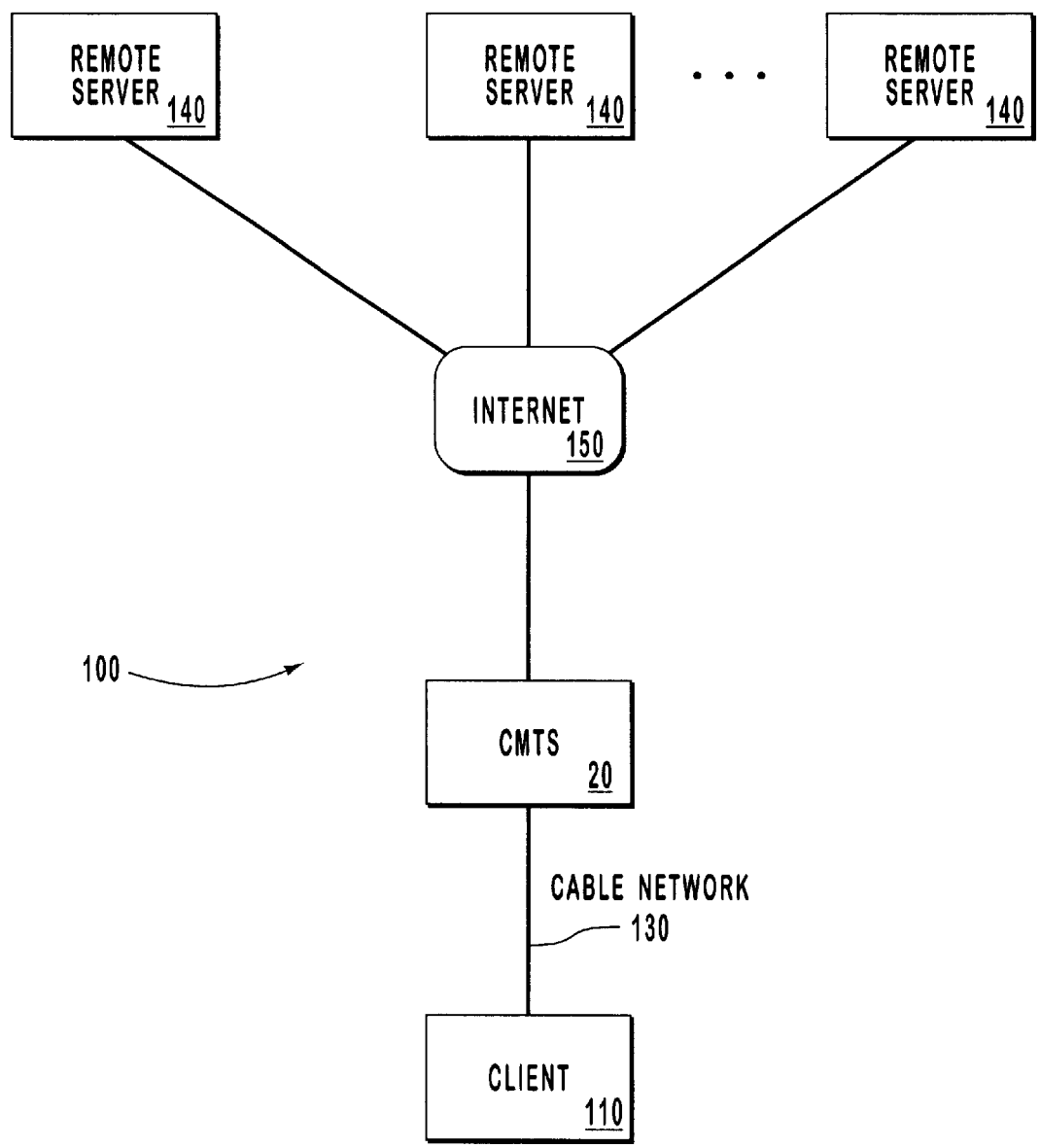
FIG. 2 is a schematic drawing of a network system that provides a suitable operating environment for the present invention.

FIG. 2 illustrates an exemplary network whereby any of the cable modems 30 of FIG. 1 can provide access for clients to the Internet, or an Intranet or other networks and combinations of networks. In FIG. 2, CMTS 20 is connected by cable network 130 to client 110, which includes an integrated cable modem. CMTS and cable network 130 provide transmission services whereby client 110 can gain access to Internet 150 and any of remote servers 140. In this manner, client 110 can communicate with remote servers 140 to retrieve information associated with the World Wide Web, to send and receive e-mail, or to perform any other functions that may be associated with Internet access.

Figure 3:
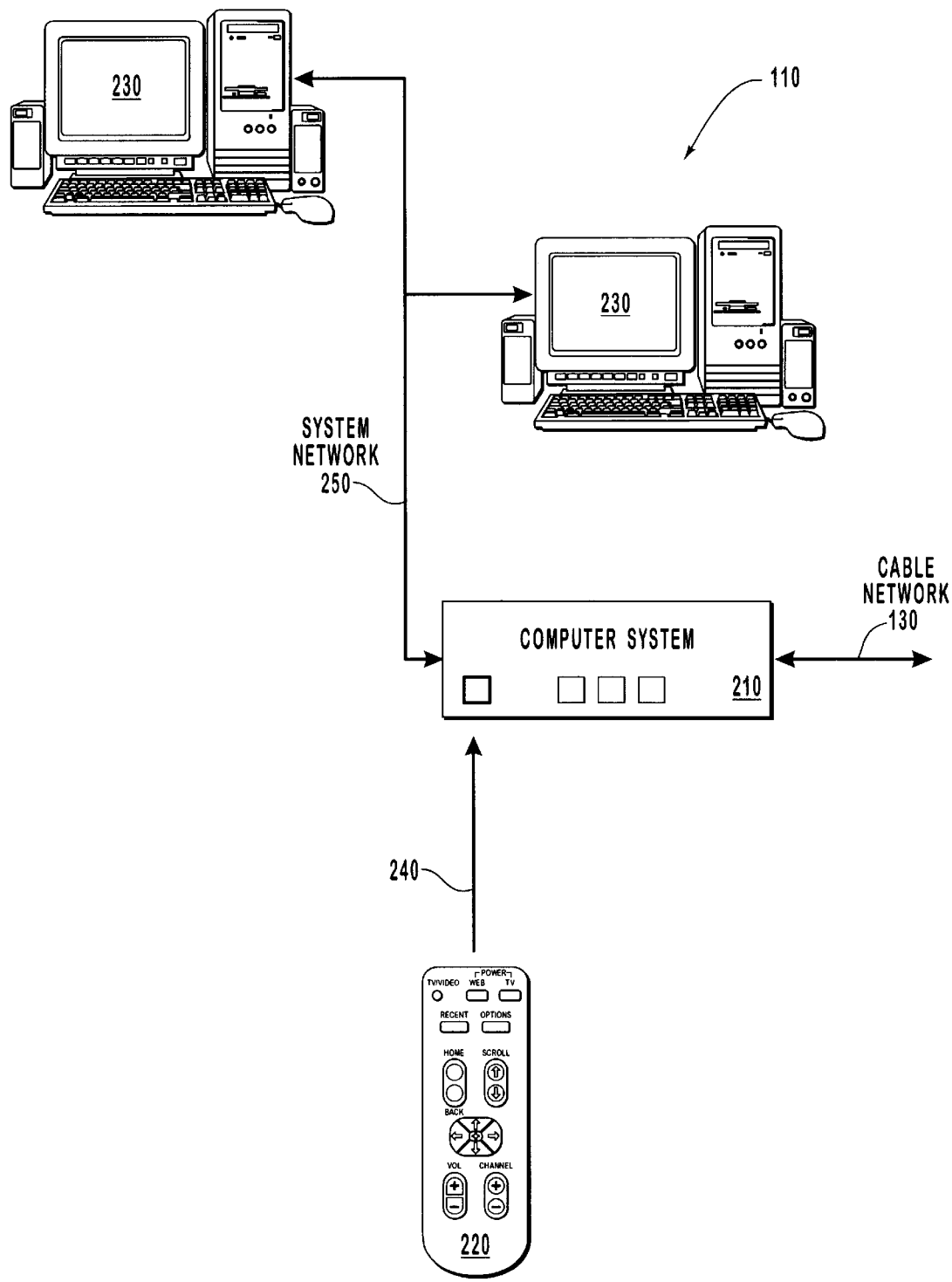
FIG. 3 is a schematic drawing of a client of FIG. 1 in which the present invention can be implemented.

FIG. 3 illustrates the client 110 of FIG. 2 in which embodiments of the present invention may be implemented. The client 110 includes a host computer system 210 (which can be characterized as a CPE), an input device 220, and one or more items of CPE 230 that are networked with the host computer system. The host computer system 210 may be a set top box, a personal computer, a workstation, a network computer, or any other special purpose or general purpose computer system capable of performing steps and acts of the present invention. Host computer system 210 has integrated therewith a cable modem according to the principles of the invention disclosed herein.

The input device 220 may be any device capable of generating control information and passing that information to the computer system 210 over an input link 240. For example, the input device 220 may be a keyboard, a mouse, a joystick, a remote control, or the like. If the input device 220 is a remote control, for example, the input link 240 would be an Infrared link. The input device 220 may also be integrated with the computer system 210 as desired.

The computer system 210 in FIG. 3 is connected to one or more items of customer premises equipment 230. For example, the customer premises equipment 230 may include personal computers, television sets, set-top boxes, workstations, network computers, or other electronic equipment.

For incoming data from the cable network 130, depending on the network address provided with the incoming data, the computer system 210 either consumes the data itself, or passes the data to one or more of the items of customer premises equipment 230 over a system network 250. Although only one system network 250 is shown, the computer system 210 may use multiple system networks to communicate with customer premises equipment 230. For example, the system network 250 may be any medium capable of communicating information to and from the computer system 210 including one or more of an Ethernet, a Universal Serial Bus (USB), a fire wire (i.e. the IEEE 1394 standard), or any other equivalent medium.

For outgoing data to the cable network 130, the computer system 210 uploads data onto the cable network 130. The outgoing data was either generated internal to the computer system 210 or was received over the system network 250 from one of the items of customer premises equipment 230.

As detailed previously, there are many reasons why a cable modems have not conventionally been implemented in a host computer. In those situations where the host and the cable modem have been integrated, the cable modem is designed to have its own processing unit and memory separate from the processing unit and memory of the host. One reason that cable modems are typically separate from hosts or CPEs is the need to send DOCSIS related messages to the cable modem while sending user data to the host. In other words, the CPE and the host are separately addressable by the cable or computer network.

Figure 4:
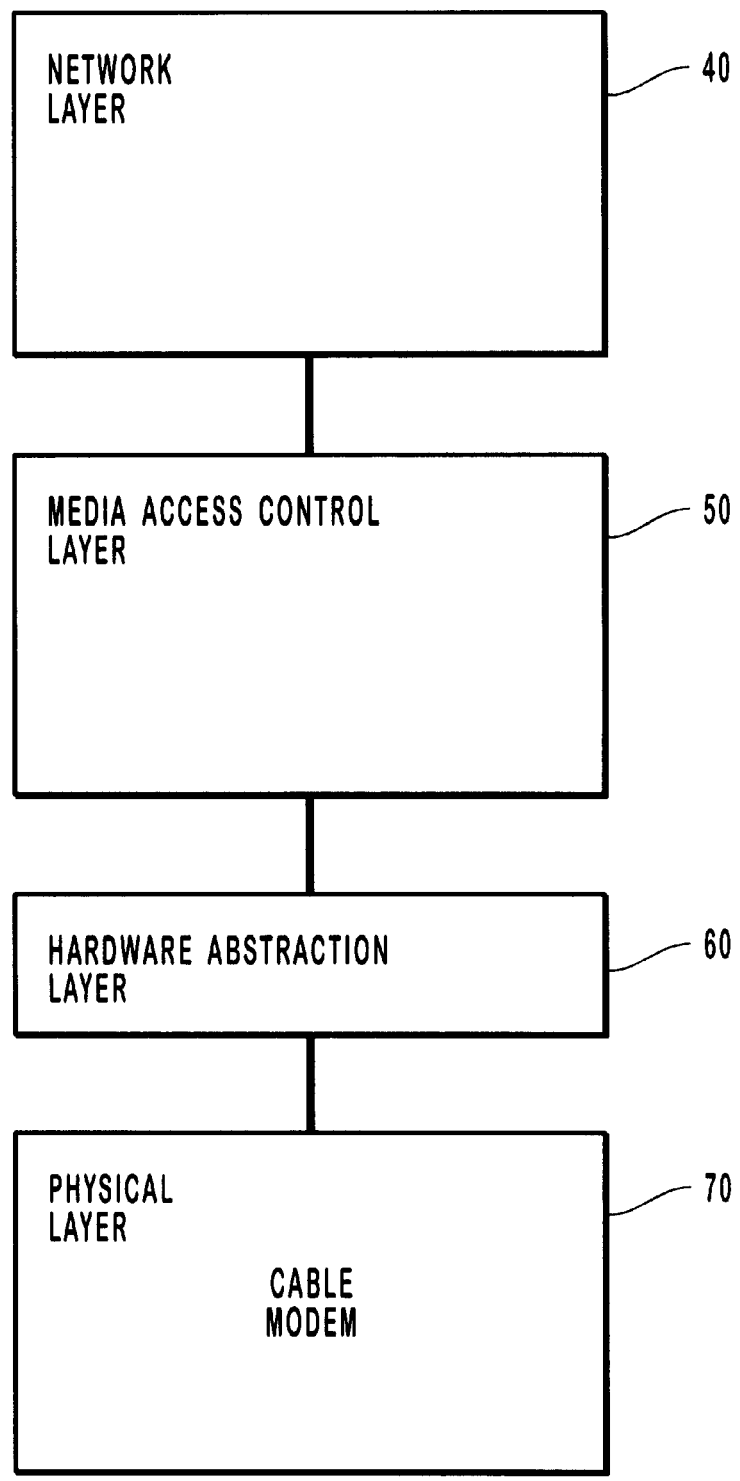
FIG. 4 is a block diagram of a protocol stack implemented by an integrated system of a cable modem and a customer premises equipment.

In accordance with the systems and methods of the present invention, FIG. 4 illustrates a block diagram of one embodiment of a protocol for host side implementation of a cable modem. A more detailed discussion of a presently preferred implementation of the protocol is described in FIG. 5. The first layer of the cable modem protocol illustrated in FIG. 4 is physical layer 70. Physical layer 70 typically defines the functions necessary to transfer data from the CMTS and the cable transmission medium to a cable modem. Included in the physical layer is the modulation format and the channel over which the data will be transmitted. The physical layer complies with DOCSIS specifications in this embodiment. A cable modem is an exemplary embodiment of physical layer 70.

Network layer 40 corresponds to the third layer of the open standards interconnection (OSI) model. Network layer 40 and higher protocol layers essentially merge with other standards and are not completely specified in the DOCSIS standard. Typically, network layer 40 is the Internet Protocol (IP) and functions much like the IP layer in typical computer networks.

Media Access Controller (MAC) layer 50 is the protocol layer below the network layer 40. MAC layer 50, in a general sense, is analogous with the data link layer of the OSI protocol model. MAC layer 50 is responsible for moving data to and from physical layer 70. More specifically, MAC layer 50, in the context of a cable modem, either receives data from the cable modem or transmits data to the CMTS over the cable modem. In part, this is accomplished by allocating a bandwidth, which refers to the rates and frequencies used in communications. MAC layer 50 typically provides a baseline privacy interface (BPI) and additional privacy is optionally provided.

As described previously, cable modems are currently stand-alone devices and include the hardware and software necessary to receive and transmit data over a cable network. As a result, the interface between the software and hardware of a cable modem varies among cable modems. The lack of uniformity has hindered the development of a self hosted cable modem. This non-uniformity is overcome by hardware abstraction layer (HAL) 60.

HAL 60 establishes a connection between MAC layer 50 and physical layer 70 and permits any host to operate with any cable modem, so long as the cable modem and associated software are compatible with hardware abstraction layer 60. HAL 60 is an application program interface (API), in one embodiment, that interfaces with MAC layer 50 and physical layer 70. Furthermore, HAL 60, in one embodiment is intended to separate the physical layer from a software layer. In effect, HAL 60 presents a defined interface to physical layer 70. Physical layer 70 processes the data received over the cable network such that it is compatible with HAL 60. HAL 60 is able to retrieve the information taken off the cable network by physical layer 70 and present it to the higher protocol layers. HAL 60 also functions to transfer data from MAC layer 50 to physical layer 70. In effect, HAL 60 replaces a top portion of physical layer 70 and a bottom portion of MAC layer 50.

Figure 5:
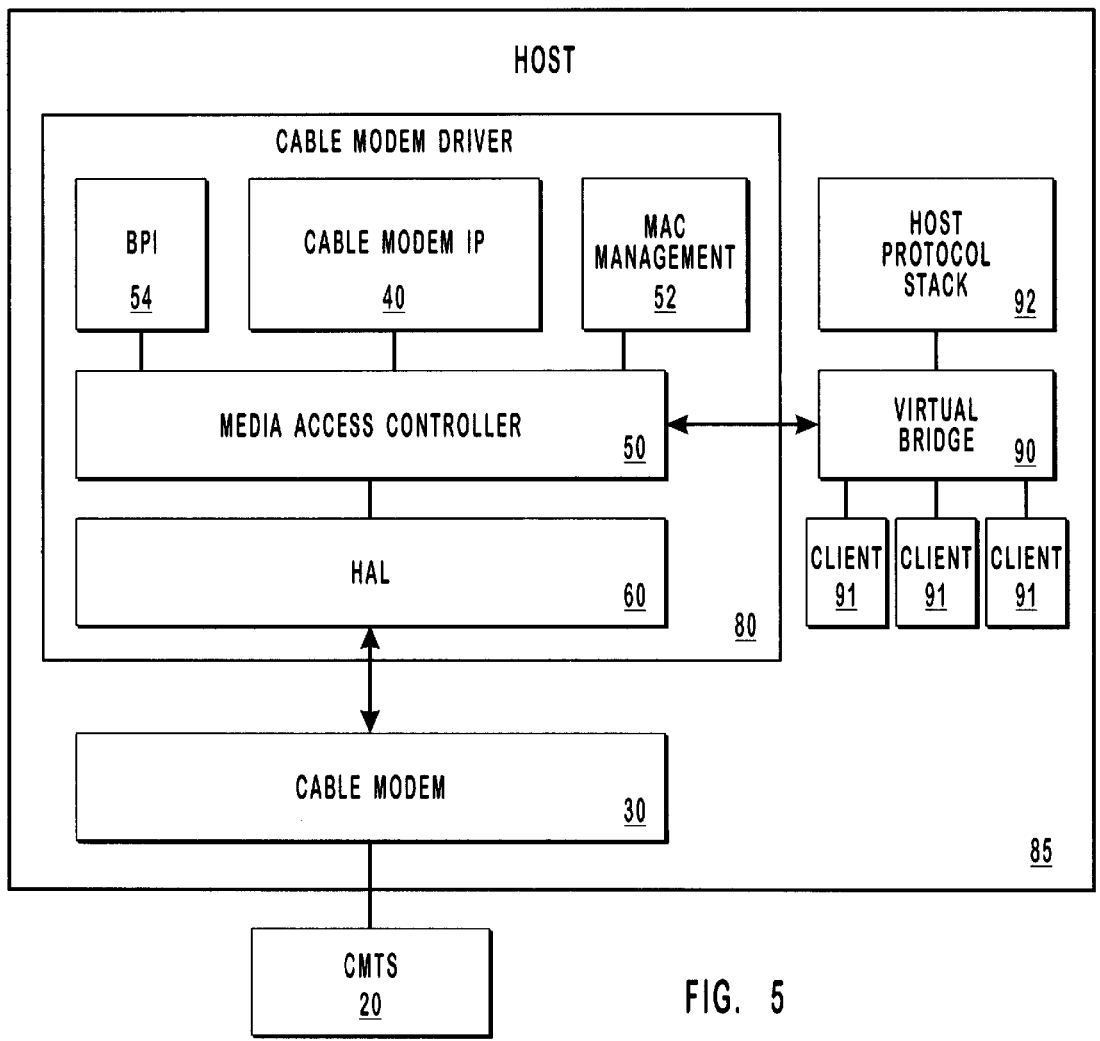
FIG. 5 is a detailed block diagram of a host having a cable modem driver implementing the protocol stack of the cable modem.

FIG. 5 is a more detailed illustration of one embodiment of a system integrating a cable modem with a CPE or host. Host 85 maintains separate the cable modem protocol stack from any the protocol stack associated with the operating system of the host. Host 85 has a cable modem driver 80, which is an exemplary method of implementing HAL 60, MAC layer 50 and, optionally, IP driver 40. Host 85, from the point of view of cable modem 30, is a CPE. Host 60 can be a computer, a set top box, a computer network, or any other CPE or system. Cable modem driver 80, however, shares the memory, CPU, and system resources of host 85 with other applications and connections.

HAL 60 is capable of interfacing with cable modem 30. HAL 60 requires that cable modem 30 process the data packets such that the data packets are compatible with HAL 60. HAL 60 retrieves the data packets from cable modem 30, processes the data packets and presents them to MAC layer 50. The functions executed by HAL 60 include handling packets and information retrieved from cable modem 30, handling MAC management messages, and initializing and controlling cable modem 30. HAL 60 executes the hardware related functions of cable modem driver 80 and exports its services to MAC layer 50.

As noted previously, HAL 60 facilitates the interoperability of cable modems with hosts by providing a standard interface. The non-uniformity of cable modems can be eliminated by the cable modems being manufactured to interface with HAL 60. In this manner, the exact method employed by a cable modem in retrieving the data packets from the cable network is no longer important to cable modem driver 80 because HAL 60 defines an interface between cable modem 30 and MAC layer 50. Thus, HAL 60 is essentially responsible for retrieving downstream data from cable modem 30 and presenting that data to MAC layer 50, and for placing upstream data from MAC layer 50 on cable modem 30.

MAC layer 50 functions as the DOCSIS compliant media access control layer and comprises BPI 54 and MAC management 52. BPI 54 is defined by DOCSIS and is implemented in MAC layer 50. MAC management 52 handles all of the MAC management issues and implements the core of the DOCSIS specifications. MAC layer 50 primarily manages the sending and receiving of MAC management messages to and from MAC management 52; the sending and receiving of MAC management messages related to BPI 54 to and from BPI 54; the sending and receiving of MAC data packets to and from IP 40; and the sending and receiving of data packets intended for host 85 to and from virtual bridge 90. MAC layer 50 provides interfaces to virtual bridge 90 and IP 40 such that data packets can be sent and received across the cable network. MAC layer 50 has the ability to control the function and physical behavior of cable modem 30. MAC layer 50 provides functions to HAL 60 which aid the transmission of packets from cable modem 30 to MAC layer 50 and from MAC layer 50 to cable modem 30.

Virtual bridge 90 is disclosed in greater detail in co-pending U.S. patent application Ser. No. 09/371,914, entitled "Hosting a Cable Modem in a Computer Using a Virtual Bridge", which issued as U.S. Pat. No. 6,618,386 on Sep. 9, 2003 and is incorporated herein by reference. In essence, virtual bridge 90 isolates cable modem 30 and cable modem driver 80 from host 85 and clients 91 such that they do not have direct access to the data packets, nor can host 85 alter the access controls of cable modem 30. As previously indicated cable modem 30 has a separate protocol stack. Thus, even though cable modem 30 and cable modem driver 80 are integrated with host 85 and share resources, host 85 is still viewed as a CPE by cable modem 30 and modem management packets are sent to MAC management 52 rather than to host 85 or clients 91. In this manner, the advantages of an external modem are retained.

FIGS. 1–5 have been discussed primarily in terms of a CPE that hosts or is integrated with a cable modem. In another embodiment, the cable modem is not integrated with the CPE, but is separate and includes the cable modem hardware and can include HAL 60 and MAC layer 50. In this embodiment, the cable modem typically has a separate processor from that of the CPE. HAL 60, in this embodiment, however functions as described herein. HAL 60 essentially separates the functionality of the cable modem from the software implementation of MAC layer 50. Because HAL 60 provides or functions as an interface between the cable modem and MAC layer 50, the cable modem hardware is capable of being developed independently of MAC layer 50. Similarly, MAC layer 50 is capable of being developed independently of the hardware of the cable modem. In this manner, the proprietary aspects of the cable modem and MAC layer 50 are protected.

Figure 6:
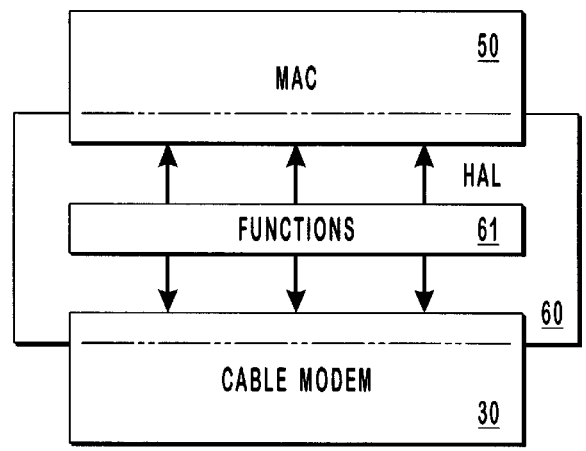
FIG. 6 is a block diagram illustrating an exemplary implementation of a hardware abstraction layer as an application program interface.

FIG. 6 is a block diagram illustrating an exemplary implementation of HAL 60 as an application program interface (API). HAL 60 is an interface than connects cable modem 30 with MAC layer 50. A portion of the protocol of cable modem 30 is implemented by HAL 60 and a portion of the protocol of MAC layer 50 is implemented by HAL 60. More specifically, MAC layer 50 implements the DOCSIS MAC protocol and HAL 60 functions as the driver for DOCSIS compliant hardware. In this manner, HAL 60 provides an interface to which both cable modem 30 and MAC layer 50 may connect. Once cable modem 30 is connected to MAC layer 50 via HAL 60, data packets are transferred from cable modem 30 to MAC layer 50 and vice versa. Cable modem 30 may process the data packets such that they are compatible with HAL 60 and in turn, HAL 60 prepares the data packet for transmission to MAC layer 50. HAL 60 also functions to place data packets provided by MAC layer 50 on cable modem 30.

In a general sense, an API provides functions, routines, protocols and tools for building software and software-related applications. An API allows applications, drivers, and other software to be written consistently with other software that interfaces with the API. The host side implementation of MAC layer 50, while not covered by DOCSIS specifications, nonetheless substantially complies with those specifications. HAL 60 permits cable modem 30 to seamlessly connect with MAC layer 50 by providing a set of functions and routines which can be utilized by cable modem 30 and by MAC layer 50. HAL 60, as an API permits cable manufactures to create modems which function in more than one type of host computer because HAL 60 provides a constant interface.

HAL 60 comprises functions 61, which are used by MAC layer 50 and cable modem 30 to communicate and transfer data packets. In general, functions 61 provide at least three areas of functionality: providing functions for initializing and controlling cable modem 30; providing functions for handling user data packets, which are routed to the CPE by MAC layer 50; and providing functions for handling messages or data packets intended for MAC management. HAL 60 abstracts control of cable modem 30 to MAC layer 50. Some of these functions are detailed in the following paragraphs. In addition, the following paragraphs describe functions associated with a hardware abstraction layer API according to one embodiment of the invention.

CmHalDriverEntry is a function that registers HAL 60 with MAC layer 50. Once HAL 60 is registered with MAC layer 50, MAC layer 50 passes or provides HAL 60 with functions that enable HAL 60 to transmit user data packets and management data packets, which have been received by cable modem 30, to MAC layer 50. MAC layer 50 also provides functions to HAL 60 that indicate whether a packet transmission has been successful. CmHalInitHandler is used by MAC layer 50 to allow HAL 60 to initialize its adapter to be ready for cable network communications. After the cable modem or other hardware components have been initialized, MAC layer 50 begins the DOCSIS initialization procedure where CMHalScanDSChannelHandler is used to scan for a valid downstream frequency. CMHalScanDSChannelHandler returns the downstream frequency that it found or returns a failure to find a downstream frequency.

CMHalSetInfoHandler enables MAC layer 50 to write onto various hardware registers of cable modem 30. CMHalQueryInfoHandler provides MAC layer 50 with the ability to query information from cable modem 30. CMHalSetModeHandler enable MAC layer 50 to write to hardware registers of cable modem 30 and set modes of cable modem 30. CmHalQueryModeHandler enables MAC layer 50 to query hardware modes.

CmHalReleaseMagmtMsgHandler permits MAC layer 50 to inform HAL 60 that a particular management data packet has been used by MAC management and can be released from storage. CMHalReleaseDataPacketHandler permits MAC layer 50 to inform or instruct HAL 60 that a particular user data packet has been used or consumed and that the user data packet can be released from storage or from a buffer. CMHalSendMgmtMsgHandler is a function that is called by MAC layer 50 to send a management data packet upstream to the CMTS. CMHalSendDataPacketHandler is a function that MAC layer 50 utilizes to send a user data packet upstream.

The appendix that accompanies this patent application further describes the specific functions, parameters, and other features of the hardware abstraction layer API according to this embodiment of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX

1. Introduction

This appendix describes a cable modem driver architecture design under a Windows CE environment in a set-top box. The cable modem design according to this embodiment of the invention complies with the DOCSIS 1.0 standard. This appendix represents only one of many possible approaches whereby a Hardware Abstraction Layer Application Program Interface (HAL API) can be implemented according to the invention, and should not be construed as limiting the scope of the invention. While the following describes a presently preferred embodiment of the HAL API, other APIs that comply with the invention as broadly described in the Detailed Description section are encompassed by the claims.

In the following example, the cable modem (CM) is designed to be a NDIS miniport driver. It contains two modules:

- CM Medium Access Control (CM MAC)
- CM Hardware Abstraction Layer (CM HAL)

The CM MAC acts as the DOCSIS-compliant MAC layer implementation of the overall CM driver. It consists of the MAC Agent component, which manages the sending and receiving of all the MAC traffic inside the CM driver. The CM MAC also includes the Baseline Privacy (BPI) component, which performs the DOCSIS Baseline Privacy key management, and the MAC Management component, which handles the rest of the DOCSIS MAC Management messages. Also, the CM MAC acts as the interface to NDIS.

The CM HAL handles all the hardware specific functions of the CM driver and exports its services to the CM MAC.

2. Definitions

This section defines data types and data structures used by the Cable Modem Medium Access Controller (CM MAC) and the Cable Modem Hardware Abstraction Layer (CM HAL) modules according to this specific embodiment of the invention.

2.1        Data types

2.1.1 CM_STATUS

CM_STATUS values are used by the CM HAL and the CM MAC functions to return status.

```
/*
 * CM_STATUS values
 *   Status values are 32-bit values laid out as follows:
 *
 *   3 3 2 2 2 2 2 2 2 2 2 2 1 1 1 1 1 1 1 1 1 1
 *   1 0 9 8 7 6 5 4 3 2 1 0 9 8 7 6 5 4 3 2 1 0 9 8 7 6 5 4 3 2 1 0
 *   +---+-+------------------------+------------------------------+
 *   |Sev|C|     Facility           |           Code               |
 *   +---+-+------------------------+------------------------------+
 *
 * where
 *
 *   Sev - is the severity code
 *      00 - Success
 *      01 - Informational
 *      10 - Warning
 *      11 - Error
 *
 *   C - is the Customer code flag
 *
```

```
 *    Facility - is the facility code
 *
 *    Code - is the facility's status code
 */ typedef NTSTATUS                         CMSTATUS,
*PCMSTATUS;

#define CM_STATUS_SUCCESS                ((CM_STATUS)STATUS_SUCCESS)
#define CM_STATUS_PENDING                ((CM_STATUS)STATUS_PENDING)
#define CM_STATUS_NOT_RECOGNIZED         ((CM_STATUS)0x00010001L)
#define CM_STATUS_NOT_COPIED             ((CM_STATUS)0x00010002L)
#define CM_STATUS_NOT_ACCEPTED           ((CM_STATUS)0x00010003L)
#define CM_STATUS_CALL_ACTIVE            ((CM_STATUS)0x00010007L)

#define CM_STATUS_ONLINE                 ((CM_STATUS)0x40010003L)
#define CM_STATUS_RESET_START            ((CM_STATUS)0x40010004L)
#define CM_STATUS_RESET_END              ((CM_STATUS)0x40010005L)

#define CM_STATUS_MEDIA_CONNECT          ((CM_STATUS)0x4001000BL)
#define CM_STATUS_MEDIA_DISCONNECT       ((CM_STATUS)0x4001000CL)
#define CM_STATUS_HARDWARE_LINE_UP       ((CM_STATUS)0x4001000DL)
#define CM_STATUS_HARDWARE_LINE_DOWN
        ((CM_STATUS)0x4001000EL)
#define CM_STATUS_INTERFACE_UP           ((CM_STATUS)0x4001000FL)
#define CM_STATUS_INTERFACE_DOWN         ((CM_STATUS)0x40010010L)
#define CM_STATUS_MEDIA_BUSY             ((CM_STATUS)0x40010011L)

#defineCM_STATUS_UCD_IGNORED
        ((CM_STATUS)0x40010012L)
```

```
#define CM_STATUS_RNG_RSP_IGNORED
      ((CM_STATUS)0x40010013L)
#defineCM_STATUS_BPI_IGNORED
      ((CM_STATUS)0x40010014L)

#define CM_STATUS_NOT_RESETTABLE          ((CM_STATUS)0x80010001L)
#define CM_STATUS_SOFT_ERRORS             ((CM_STATUS)0x80010003L)
#define CM_STATUS_HARD_ERRORS             ((CM_STATUS)0x80010004L)
#define CM_STATUS_BUFFER_OVERFLOW
      ((CM_STATUS)STATUS_BUFFER_OVERFLOW)

#define CM_STATUS_FAILURE
      ((CM_STATUS)STATUS_UNSUCCESSFUL)
#define CM_STATUS_RESOURCES
      ((CM_STATUS)STATUS_INSUFFICIENT_RESOURCES)
#define CM_STATUS_NOT_SUPPORTED
      ((CM_STATUS)STATUS_NOT_SUPPORTED)
#define CM_STATUS_CLOSING                 ((CM_STATUS)0xC0010002L)
#define CM_STATUS_BAD_VERSION             ((CM_STATUS)0xC0010004L)
#define CM_STATUS_BAD_CHARACTERISTICS
      ((CM_STATUS)0xC0010005L)
#define CM_STATUS_ADAPTER_NOT_FOUND
      ((CM_STATUS)0xC0010006L)
#define CM_STATUS_OPEN_FAILED             ((CM_STATUS)0xC0010007L)
#define CM_STATUS_DEVICE_FAILED           ((CM_STATUS)0xC0010008L)
#define CM_STATUS_MULTICAST_FULL          ((CM_STATUS)0xC0010009L)
#define CM_STATUS_MULTICAST_EXISTS        ((CM_STATUS)0xC001000AL)
#define CM_STATUS_MULTICAST_NOT_FOUND
      ((CM_STATUS)0xC001000BL)
#define CM_STATUS_REQUEST_ABORTED         ((CM_STATUS)0xC001000CL)
#define CM_STATUS_RESET_IN_PROGRESS       ((CM_STATUS)0xC001000DL)
```

```
#define CM_STATUS_CLOSING_INDICATING        ((CM_STATUS)0xC001000EL)
#define CM_STATUS_INVALID_PACKET            ((CM_STATUS)0xC001000FL)
#define CM_STATUS_OPEN_LIST_FULL            ((CM_STATUS)0xC0010010L)
#define CM_STATUS_ADAPTER_NOT_READY
        ((CM_STATUS)0xC0010011L)
#define CM_STATUS_ADAPTER_NOT_OPEN          ((CM_STATUS)0xC0010012L)
#define CM_STATUS_NOT_INDICATING            ((CM_STATUS)0xC0010013L)
#define CM_STATUS_INVALID_LENGTH            ((CM_STATUS)0xC0010014L)
#define CM_STATUS_INVALID_DATA              ((CM_STATUS)0xC0010015L)
#define CM_STATUS_BUFFER_TOO_SHORT          ((CM_STATUS)0xC0010016L)
#define CM_STATUS_INVALID_OID               ((CM_STATUS)0xC0010017L)
#define CM_STATUS_ADAPTER_REMOVED           ((CM_STATUS)0xC0010018L)
#define CM_STATUS_UNSUPPORTED_MEDIA
        ((CM_STATUS)0xC0010019L)
#define CM_STATUS_GROUP_ADDRESS_IN_USE
        ((CM_STATUS)0xC001001AL)
#define CM_STATUS_FILE_NOT_FOUND            ((CM_STATUS)0xC001001BL)
#define CM_STATUS_ERROR_READING_FILE
        ((CM_STATUS)0xC001001CL)
#define CM_STATUS_ALREADY_MAPPED            ((CM_STATUS)0xC001001DL)
#define CM_STATUS_RESOURCE_CONFLICT         ((CM_STATUS)0xC001001EL)
#define CM_STATUS_NO_CABLE                  ((CM_STATUS)0xC001001FL)

#define CM_STATUS_INVALID_SAP               ((CM_STATUS)0xC0010020L)
#define CM_STATUS_SAP_IN_USE                ((CM_STATUS)0xC0010021L)
#define CM_STATUS_INVALID_ADDRESS           ((CM_STATUS)0xC0010022L)
#define CM_STATUS_VC_NOT_RESERVED           ((CM_STATUS)0xC0010023L)
#define CM_STATUS_DEST_OUT_OF_ORDER
        ((CM_STATUS)0xC0010024L)
#define CM_STATUS_VC_NOT_AVAILABLE          ((CM_STATUS)0xC0010025L)
```

```
#define CM_STATUS_CELLRATE_NOT_AVAILABLE
        ((CM_STATUS)0xC0010026L)
#define CM_STATUS_INCOMPATABLE_QOS        ((CM_STATUS)0xC0010027L)

#define CM_STATUS_MESSGQ_CREATE_FAILED
        ((CM_STATUS)0xC0010028L)
#define CM_STATUS_MESSGQ_WRITE_FAILED
        ((CM_STATUS)0xC0010029L)
#define CM_STATUS_MESSGQ_READ_FAILED
        ((CM_STATUS)0xC0010030L)

#define CM_STATUS_CREATE_THREAD_FAILED
        ((CM_STATUS)0xC0010031L)

#defineCM_STATUS_INVALID_ATTR_LEN
        ((CM_STATUS)0xC0010032L)
#defineCM_STATUS_REQD_ATTR_MISSING
        ((CM_STATUS)0xC0010033L)
#define CM_STATUS_INVALID_AUTH_KEY_SEQ_NUM
        ((CM_STATUS)0xC0010034L)
#defineCM_STATUS_INVALID_TEK_SID
        ((CM_STATUS)0xC0010035L)
```

2.1.2 CM_HAL_OID

CM_HAL_OID values identify the various hardware objects that need to be set and queried by the CM MAC.

```
/*
 * CM_HAL_OID values
```

```
 *  OID values are 32-bit values laid out as follows:
 *
 *   3 3 2 2 2 2 2 2 2 2 2 2 1 1 1 1 1 1 1 1 1 1
 *   1 0 9 8 7 6 5 4 3 2 1 0 9 8 7 6 5 4 3 2 1 0 9 8 7 6 5 4 3 2 1 0
 *  +-+------------------------------+------------------------------+
 *  |M|        Unused                |          OID                 |
 *  +-+------------------------------+------------------------------+
 *
 *  where
 *
 *      M - the multiple instances flag
 *          0 – Only one instance of the HAL OID can exist
 *          1 – Multiple instances of the HAL OID can exist
 *
 *      OID – the 16-bit OID value
 *
 */ typedef    UINT                         CM_HAL_OID;

/* Hardware Initialization Related: */ define    CM_HAL_OID_PID               ((CM_HAL_OID)0x80000001)

define                                 CM_HAL_OID_MAC_PROTOCOL_VER_HIGH
((CM_HAL_OID)0x00000002)
#define                                 CM_HAL_OID_MAC_PROTOCOL_VER_LOW
((CM_HAL_OID)0x00000003)
```

```
#define              CM_HAL_OID_MAX_UPSTREAM_SIDS
((CM_HAL_OID)0x00000004)

/* Packet Filtering Related */ define         CM_HAL_OID_MAX_DNSTREAM_MSG_DA_UNICAST_FILTERS
((CM_HAL_OID)0x0000000A)
#define         CM_HAL_OID_MAX_DNSTREAM_MSG_DA_MULTICAST_FILTERS
((CM_HAL_OID)0x0000000B)

#define         CM_HAL_OID_MAX_DNSTREAM_PDU_DA_UNICAST_FILTERS
((CM_HAL_OID)0x0000000C)
#define         CM_HAL_OID_MAX_DNSTREAM_PDU_DA_MULTICAST_FILTERS
((CM_HAL_OID)0x0000000D)

#define                CM_HAL_OID_DNSTREAM_MSG_UNICAST_DA
((CM_HAL_OID)0x8000000E)
#define                CM_HAL_OID_DNSTREAM_MSG_MULTICAST_DA
((CM_HAL_OID)0x8000000F)

#define    CM_HAL_OID_DNSTREAM_PDU_UNICAST_DA
((CM_HAL_OID)0x80000010)
#define    CM_HAL_OID_DNSTREAM_PDU_MULTICAST_DA
((CM_HAL_OID)0x80000011)

/* BP Initialization Related: */ define                 CM_HAL_OID_BP_SECURITY_VER_HIGH
((CM_HAL_OID)0x00000016)
#define                 CM_HAL_OID_BP_SECURITY_VER_LOW
((CM_HAL_OID)0x00000017)
```

```
#define            CM_HAL_OID_UNENCRYPTED_DATA_PDU_LEN
((CM_HAL_OID)0x00000018)
#define            CM_HAL_OID_UNENCRYPTED_RSVD_PDU_LEN
((CM_HAL_OID)0x00000019)
#define            CM_HAL_OID_UNENCRYPTED_ATM_PDU_LEN
((CM_HAL_OID)0x00000020)
#define            CM_HAL_OID_UPSTREAM_DEFAULT_PRIV_VER
((CM_HAL_OID)0x00000021)

#define            CM_HAL_OID_MAX_DNSTREAM_DES_SIDS
((CM_HAL_OID)0x00000022)
#define            CM_HAL_OID_MAX_UPSTREAM_DES_SIDS
((CM_HAL_OID)0x00000023)

/* UCD Related: */ define            CM_HAL_OID_UPSTREAM_CONFIG
((CM_HAL_OID)0x00000024)

/* RNG-REQ Related: */ define            CM_HAL_OID_RNG_REQ_FIFO
((CM_HAL_OID)0x00000025)
#define    CM_HAL_OID_ADJUST_UPSTREAM_POWER
        ((CM_HAL_OID)0x0000004E)
#define    CM_HAL_OID_UPSTREAM_POWER_LEVEL
        ((CM_HAL_OID)0x0000004F)

/* RNG-RSP Related: */
```

```
1   #define                                    CM_HAL_OID_PRIMARY_SID
2   ((CM_HAL_OID)0x00000026)

3   #define                                    CM_HAL_OID_RNG_ADJUST
4   ((CM_HAL_OID)0x00000027)

5
    /* REG-RSP Related: */
6

7   #define                                    CM_HAL_OID_UPSTREAM_SID
8   ((CM_HAL_OID)0x80000029)

9   /* BPI TEK KEY-REPLY Related: */
10

11  #define                                    CM_HAL_OID_DNSTREAM_DES_SID
    ((CM_HAL_OID)0x8000002A)
12  #define                                    CM_HAL_OID_UPSTREAM_DES_SID
13  ((CM_HAL_OID)0x8000002B)
    #define                                    CM_HAL_OID_DES_KEY_EVEN
14  ((CM_HAL_OID)0x8000002C)
15  #define                                    CM_HAL_OID_DES_KEY_ODD
16  ((CM_HAL_OID)0x8000002D)
17  #define                                    CM_HAL_OID_DES_IV_EVEN
    ((CM_HAL_OID)0x8000002E)
18  #define                                    CM_HAL_OID_DES_IV_ODD
19  ((CM_HAL_OID)0x8000002F)

20
    /* Statistics/Diagnostics Related: */
21

22  #define                                    CM_HAL_OID_DNSTREAM_FIFO_FULL_COUNT
    ((CM_HAL_OID)0x00000030)
23

24
```

```
#define         CM_HAL_OID_DNSTREAM_MSG_OVERRUN_COUNT
((CM_HAL_OID)0x00000031)
#define         CM_HAL_OID_DNSTREAM_PDU_OVERRUN_COUNT
((CM_HAL_OID)0x00000032)
#define         CM_HAL_OID_DNSTREAM_QUALIFIED_MAP_COUNT
((CM_HAL_OID)0x00000033)
#define         CM_HAL_OID_DNSTREAM_QUALIFIED_SYNC_COUNT
((CM_HAL_OID)0x00000034)
#define         CM_HAL_OID_DNSTREAM_QUALIFIED_UCD_COUNT
((CM_HAL_OID)0x00000035)
#define         CM_HAL_OID_DNSTREAM_REJECTED_MAP_COUNT
((CM_HAL_OID)0x00000036)
#define         CM_HAL_OID_DNSTREAM_MPEG_PACKET_ERRORS_COUNT
((CM_HAL_OID)0x00000037)
#define         CM_HAL_OID_DNSTREAM_MSG_CRC_FAILURE_COUNT
((CM_HAL_OID)0x00000038)
#define         CM_HAL_OID_DNSTREAM_HCS_FAILURE_COUNT
((CM_HAL_OID)0x00000039)
#define         CM_HAL_OID_DNSTREAM_PDU_COUNT
((CM_HAL_OID)0x0000003A)
#define         CM_HAL_OID_DNSTREAM_MSG_COUNT
((CM_HAL_OID)0x0000003B)
#define         CM_HAL_OID_DNSTREAM_VALID_HDR_COUNT
((CM_HAL_OID)0x0000003C)
#define         CM_HAL_OID_DNSTREAM_MSG_BYTES_COUNT
((CM_HAL_OID)0x0000003D)

#define         CM_HAL_OID_UPSTREAM_PACKET_COUNT
((CM_HAL_OID)0x8000003E)
#define         CM_HAL_OID_UPSTREAM_UNICAST_MINISLOTS
((CM_HAL_OID)0x8000003F)
```

```
#define              CM_HAL_OID_UPSTREAM_CONTENTION_MINISLOTS
((CM_HAL_OID)0x80000040)
#define              CM_HAL_OID_UPSTREAM_BW_RE_REQ_COUNT
((CM_HAL_OID)0x80000041)
#define              CM_HAL_OID_UPSTREAM_BW_REQ_FAILURE_COUNT
((CM_HAL_OID)0x80000042)
#define       CM_HAL_OID_UPSTREAM_REQ_DATA_PDU_RETRANSMIT_COUNT
((CM_HAL_OID)0x80000043)
#define          CM_HAL_OID_UPSTREAM_REQ_DATA_PDU_FAILURE_COUNT
((CM_HAL_OID)0x80000044)
#define              CM_HAL_OID_UPSTREAM_RNG_REQ_COUNT
((CM_HAL_OID)0x00000045)
#define              CM_HAL_OID_UPSTREAM_BYTE_COUNT
((CM_HAL_OID)0x00000046)

/* Miscellaneous: */ define              CM_HAL_OID_LOST_SYNC_INTERVAL
((CM_HAL_OID)0x00000048)
#define              CM_HAL_OID_MAX_BW_REREQ_COUNT
((CM_HAL_OID)0x00000049)
#define              CM_HAL_OID_CONTENTION_DATA_LEN
((CM_HAL_OID)0x0000004A)

#define              CM_HAL_OID_UPSTREAM_GROUPCAST_SID
((CM_HAL_OID)0x8000004B)

#define              CM_HAL_OID_UPSTREAM_FWD_LOOKUP_BASE_OFFSET
((CM_HAL_OID)0x0000004C)
#define              CM_HAL_OID_UPSTREAM_REVERSE_LOOKUP_BASE_OFFSET
((CM_HAL_OID)0x0000004D)
```

2.1.3 CM_HAL_MODE

CM_HAL_MODE values identify the various hardware modes that need to be set and queried by the CM MAC driver.

```
/*
 * CM_HAL_MODE values
 * MODE values are 32-bit values laid out as follows:
 *
 *   3 3 2 2 2 2 2 2 2 2 2 2 1 1 1 1 1 1 1 1 1 1
 *   1 0 9 8 7 6 5 4 3 2 1 0 9 8 7 6 5 4 3 2 1 0 9 8 7 6 5 4 3 2 1 0
 *   +-+-----------------------------+------------------------------+
 *   |M|        Unused               |            Mode              |
 *   +-+-----------------------------+------------------------------+
 *
 * where
 *
 *   M - the multiple instances flag
 *       0 – Only one instance of the HAL MODE can exist
 *       1 – Multiple instances of the HAL MODE can exist
 *
 *   MODE – the 16-bit MODE value
 *
 */ typedef    UINT                       CM_HAL_MODE;

/* Hardware Initialization Related: */
```

```
/* Packet Filtering Related */ define            CM_HAL_MODE_DNSTREAM_MSG_FILTER_PROMISCUOUS
((CM_HAL_MODE)0x00000000)
#define            CM_HAL_MODE_DNSTREAM_MSG_FILTER_MAP_TO_MEMORY
((CM_HAL_MODE)0x00000001)
#define         CM_HAL_MODE_DNSTREAM_MSG_FILTER_TSTAMP_TO_MEMORY
((CM_HAL_MODE)0x00000002)
#define
CM_HAL_MODE_DNSTREAM_MSG_FILTER_UNCHANGED_UCD_TO_MEMORY
((CM_HAL_MODE)0x00000003)

#define            CM_HAL_MODE_DNSTREAM_PDU_FILTER_ATM_TO_MEMORY
((CM_HAL_MODE)0x00000004)
#define
CM_HAL_MODE_DNSTREAM_PDU_FILTER_FULL_SECURITY_TO_MEMORY
((CM_HAL_MODE)0x00000005)
#define             CM_HAL_MODE_DNSTREAM_PDU_FILTER_BP_TO_MEMORY
((CM_HAL_MODE)0x00000006)
#define
CM_HAL_MODE_DNSTREAM_PDU_FILTER_NO_SECURITY_TO_MEMORY
((CM_HAL_MODE)0x00000007)
#define            CM_HAL_MODE_DNSTREAM_PDU_FILTER_SID_PROMISCUOUS
((CM_HAL_MODE)0x00000008)
#define
CM_HAL_MODE_DNSTREAM_PDU_FILTER_BP_VERSION_PROMISCUOUS
((CM_HAL_MODE)0x00000009)

#define            CM_HAL_MODE_DNSTREAM_MSG_DA_FILTER_PROMISCUOUS
((CM_HAL_MODE)0x0000000A)
```

```
#define         CM_HAL_MODE_DNSTREAM_MSG_DA_FILTER_BROADCAST
((CM_HAL_MODE)0x0000000B)
#define
CM_HAL_MODE_DNSTREAM_MSG_DA_FILTER_GENERAL_MULTICAST
((CM_HAL_MODE)0x0000000C)
#define
CM_HAL_MODE_DNSTREAM_MSG_DA_FILTER_SPECIFIC_MULTICAST
((CM_HAL_MODE)0x0000000D)
#define         CM_HAL_MODE_DNSTREAM_MSG_DA_FILTER_UNICAST
((CM_HAL_MODE)0x0000000E)

#define         CM_HAL_MODE_DNSTREAM_PDU_DA_FILTER_ATM
((CM_HAL_MODE)0x0000000F)
#define         CM_HAL_MODE_DNSTREAM_PDU_DA_FILTER_RSVD_PACKETS
((CM_HAL_MODE)0x00000010)
#define         CM_HAL_MODE_DNSTREAM_PDU_DA_FILTER_BP
((CM_HAL_MODE)0x00000011)

#define         CM_HAL_MODE_DNSTREAM_PDU_DA_FILTER_PROMISCUOUS
((CM_HAL_MODE)0x00000012)
#define         CM_HAL_MODE_DNSTREAM_PDU_DA_FILTER_BROADCAST
((CM_HAL_MODE)0x00000013)
#define
CM_HAL_MODE_DNSTREAM_PDU_DA_FILTER_GENERAL_MULTICAST
((CM_HAL_MODE)0x00000014)
#define
CM_HAL_MODE_DNSTREAM_PDU_DA_FILTER_SPECIFIC_MULTICAST
((CM_HAL_MODE)0x00000015)
#define         CM_HAL_MODE_DNSTREAM_PDU_DA_FILTER_UNICAST
((CM_HAL_MODE)0x00000016)
```

```
/* BP Initialization Related: */ define                    CM_HAL_MODE_DNSTREAM_BP_ENABLE
((CM_HAL_MODE)0x0000001A)
#define                    CM_HAL_MODE_DNSTREAM_DES_CBC
((CM_HAL_MODE)0x0000001B)

#define                    CM_HAL_MODE_UPSTREAM_BP_ENABLE
((CM_HAL_MODE)0x0000001C)
#define                    CM_HAL_MODE_UPSTREAM_DES_CBC
((CM_HAL_MODE)0x0000001D)

/* UCD Related: */ define              CM_HAL_MODE_UPSTREAM_CHANNEL_ID_VALIDATE
((CM_HAL_MODE)0x00000020)

/* Ranging Related: */ define                    CM_HAL_MODE_CLEAR_RNG_REQ_FIFO
((CM_HAL_MODE)0x00000021)
#define                    CM_HAL_MODE_TRANSMIT_INIT_MAINT_RNG_REQ
((CM_HAL_MODE)0x00000022)
#define                    CM_HAL_MODE_RETRANSMIT_INIT_MAINT_RNG_REQ
((CM_HAL_MODE)0x00000040)
#define                    CM_HAL_MODE_TRANSMIT_STN_MAINT_RNG_REQ
((CM_HAL_MODE)0x00000023)
#define                    CM_HAL_MODE_TRANSMIT_PERIODIC_RNG_REQ
((CM_HAL_MODE)0x00000024)

/* BPI TEK KEY-REPLY Related: */
```

```
#define                    CM_HAL_MODE_DNSTREAM_DES_SID_ENABLE
    ((CM_HAL_MODE)0x80000025)

/* Miscellaneous: */ define                                   CM_HAL_MODE_RESET
    ((CM_HAL_MODE)0x00000030)
#define                            CM_HAL_MODE_UPSTREAM_RESET
    ((CM_HAL_MODE)0x00000031)
#define                            CM_HAL_MODE_DNSTREAM_RESET
    ((CM_HAL_MODE)0x00000032)
#define                           CM_HAL_MODE_ENABLE_INTERRUPT
    ((CM_HAL_MODE)0x00000033)

#define                        CM_HAL_MODE_UPSTREAM_IGNORE_SYNC
    ((CM_HAL_MODE)0x00000034)
#define                       CM_HAL_MODE_UPSTREAM_TRANSMIT_INHIBIT
    ((CM_HAL_MODE)0x00000035)
#define                       CM_HAL_MODE_UPSTREAM_TRANSMIT_ENABLE
    ((CM_HAL_MODE)0x00000036)
#define                       CM_HAL_MODE_UPSTREAM_PRIMARY_SID_ENABLE
    ((CM_HAL_MODE)0x00000037)

#define                       CM_HAL_MODE_UPSTREAM_GROUPCAST_SID_ENABLE
    ((CM_HAL_MODE)0x80000038)

#define                       CM_HAL_MODE_UPSTREAM_UNICAST_SID_ENABLE
    ((CM_HAL_MODE)0x80000039)
```

2.1.4 CM_MAC_OID

CM_MAC_OID values are used by the CM HAL to indicate status of various operations to the CM MAC.

```
/*
 * CM_MAC_OID values
 * OID values are 32-bit values laid out as follows:
 *
 * 3 3 2 2 2 2 2 2 2 2 2 2 1 1 1 1 1 1 1 1 1 1
 * 1 0 9 8 7 6 5 4 3 2 1 0 9 8 7 6 5 4 3 2 1 0 9 8 7 6 5 4 3 2 1 0
 * +-+------------------------------+------------------------------+
 * |M|        Unused                |         OID                  |
 * +-+------------------------------+------------------------------+
 *
 * where
 *
 *    M - the multiple instances flag
 *        0 - Only one instance of the MAC OID can exist
 *        1 - Multiple instances of the MAC OID can exist
 *
 *    OID - the 16-bit OID value
 *
 */ typedef    UINT                          CM_MAC_OID;

define                                  CM_MAC_OID_DNSTREAM_SCAN     ((CM_MAC_OID)0x00000000)
```

```
#define                     CM_MAC_OID_PULSE_LOST
((CM_MAC_OID)0x00000001)
#define                     CM_MAC_OID_SYNC_LOST
((CM_MAC_OID)0x00000002)
#define                     CM_MAC_OID_RNG_REQ_SENT
((CM_MAC_OID)0x00000003)
#define                     CM_MAC_OID_MAP_UCD_CHANGE_DETECTED
((CM_MAC_OID)0x00000004)

#define                     CM_MAC_OID_LOST_FEC_LOCK
((CM_MAC_OID)0x00000005)
#define                     CM_MAC_OID_BANDWIDTH_REQUEST_FAILED
((CM_MAC_OID)0x00000006)
```

2.2	Data Structures
2.2.1	MGMT_MSG

The Management message structure is used to pass DOCSIS MAC Management messages between the CM MAC and the CM HAL.

```
typedef struct _MGMT_MSG_
{
    HANDLE              hPacket;
    PVOID               pvPacketStart;
    UINT                uiPacketLen;
    struct _MGMT_MSG_   *pNext;

} MGMT_MSG, *PMGMT_MSG;
```

*hPacket*

Handle to the Management message packet.

*pvPacketStart*

Starting address of the Management message packet.

*uiPacketLen*

Length of the Management message packet.

*pNext*

For CM HAL Reserved Use.

2.2.2 ETHERNET_PACKET

The Ethernet Packet structure is used to pass MAC Data PDUs between the CM MAC and the CM HAL.

typedef struct _ETHERNET_PACKET_ {

HANDLE hPacket;
    PDATA_BUFFER pDataBuffer;
    struct _ETHERNET_PACKET_ *pNext;

**} ETHERNET_PACKET, *PETHERNET_PACKET;**

*hPacket*

Handle to the Ethernet packet.

*pDataBuffer*

The Ethernet packet is a simple linked list of data buffers, whose structure is defined as follows:

```
typedef struct _DATA_BUFFER_ {

PVIOD                    pvStart;
    UINT                     uiLen;
    struct _DATA_BUFFER_     *pNext;

} DATA_BUFFER, *PDATA_BUFFER;
```

*pNext*

For CM HAL Reserved Use.

2.2.3 DOCSIS_HEADER

All the MAC packets (Management messages and Ethernet packets) are preceded by a DOCSIS-specific header, whose structure is defined as follows:

```
typedef    struct _DOCSIS_HDR_ {

BYTE       bFC;
    BYTE       bMacParm;
    USHORT     usLen;
    PBYTE      pbEhdr;
    USHORT     usHcs;
```

} DOCSIS_HDR, *PDOCSIS_HDR;

*bFC*

The Frame Control field identifies the MAC Header type. Refer to the DOCSIS RFI specification for more details.

*bMacParm*

Parameter field whose value is dependent on the Frame Control field. Refer to the DOCSIS RFI specification for more details.

*usLen*

Length of the MAC frame. This is always set to 0 by the CM MAC while sending MAC frames upstream to the CMTS. The CM HAL (or the hardware itself) should overwrite it with the appropriate value. Refer to the DOCSIS RFI specification for more details.

*pbEhdr*

Pointer to Extended Header, if present or NULL. Refer to the DOCSIS RFI specification for more details.

*usHcs*

Header Checksum. This is also always set to 0 by the CM MAC while sending MAC frames upstream to the CMTS. The CM HAL (or the hardware itself) should overwrite it with the appropriate value. Refer to the DOCSIS RFI specification for more details.

2.2.4 DNSTREAM_CHANNEL_PARAMS

This structure describes the downstream channel parameters.

typedef struct _DNSTREAM_CHANNEL_PARAMS_ {

ULONG        ulFreq;
    ULONG        ulSymbolRate;
    USHORT      usQam;
    UCHAR       ucAnnex;

**} DNSTREAM_CHANNEL_PARAMS, *PDNSTREAM_CHANNEL_PARAMS;**

*ulFreq*

The downstream channel center frequency in Hz.

*ulSymbolRate*

Symbol Rate. If NULL, MCNS symbol rate is used.

*usQam*

Specifies whether the channel uses 64 QAM or 256 QAM modulation. If not specified, default is 64 QAM.

*ucAnnex*

Default is Annex-B.

2.2.5 UCD

This structure is used to specify the upstream configuration parameters to the CM HAL. This exactly corresponds to the UCD (Upstream Channel Descriptor Message) found in the DOCSIS RFI specification.

```
#define MAX_UCD_PREAMBLE_PATTERN_LEN         128
define MAX_UCD_BURST_DESCS                  16 typedef struct _UCD_ {

ULONG              ulUpstreamFreq;
        BYTE               bUpstreamChannelId;
        BYTE               bConfigChangeCount;
        BYTE               bMiniSlotSize;
        BYTE               bDnstreamChannelId;
        BYTE               bSymbolRate;
        BYTE           bPreamblePatternLen;
        BYTE               bBurstDescCount;
        BYTE
        pbPreamblePattern[MAX_UCD_PREAMBLE_PATTERN_LEN];
        BURST_DESC         pBurstDesc[MAX_UCD_BURST_DESCS];

} UCD, *PUCD;
```

*ulUpstreamFreq*

The upstream channel center frequency in Hz.

*bUpstreamChannelId*

The Upstream Channel ID.

bConfigChangeCount

The Configuration Change Count inside the UCD message.

bMiniSlotSize

The minislot size specified in the UCD.

bDnstreamChannelId

The downstream channel ID.

bSymbolRate

Upstream Symbol Rate.

bPreamblePatternLen

The length of the preamble pattern bBurstDescCount

The number of burst descriptors specified in the UCD.

pbPreamblePattern

The preamble pattern string pBurstDesc

The array of burst descriptors describing each of the burst profiles supported in this upstream channel. The burst descriptor structure is as follows:

```
typedef struct _BURST_DESC_ {

BYTE        bIuc;
    BYTE        bModulationType;
    BYTE        bDiffEncodingOnOff;
    USHORT      usPreambleLen;
    USHORT      usPreambleValOffset;
    BYTE        bFecBytes;
    BYTE        bFecCodewordInfoBytes;
    USHORT      usScramblerSeed;
    BYTE        bMaxBurstSize;
    BYTE        bGuardTimeSize;
    BYTE        bLastCodewordLen;
    BYTE        bScramblerOnOff;

} BURST_DESC, *PBURST_DESC;
```

2.2.5 RNG_ADJUST

This structure is used to pass on the ranging adjustments obtained form the CMTS as part of the Ranging Response message to the CM HAL.

```
typedef struct _RNG_ADJUST_ {

USHORT      usSid;
    UCHAR       ucRangingStatus;
    LONG        lTiming;
    SHORT       sOffsetFreq;
```

```
    CHAR           cPwrLevel;
    PTRANSMIT_EQ_COEF   pTransmitEqCoef;

} RNG_ADJUST, *PRNG_ADJUST;
```

*usSid*

The primary SID (Service ID) that cable modem driver has obtained from the CMTS.

*ucRangingStatus*

The status of the last ranging response obtained from the CMTS. Possible values are 1 = Continue, 2 = Abort and 3 = Success.

*lTiming*

The timing offset

*sOffsetFreq*

The frequency Offset.

*cPwrLevel*

The power level offset

*pTransmitEqCoef*

The transmit equalization parameters. Its structure is as follows.

```
typedef struct _TRANSMIT_EQ_COEF_ {

USHORT          usTapsPerSymbol;
    UCHAR           ucNumFwdTaps;
    UCHAR           ucNumRevTaps;
    PCOMPLEX_COEF   pComplexCoefFwdTaps;
    PCOMPLEX_COEF   pComplexCoefRevTaps;

} TRANSMIT_EQ_COEF, *PTRANSMIT_EQ_COEF;
``` where COMPLEX_COEF is in turn a simple structure to hold complex numbers.

```
typedef struct _COMPLEX_COEF_ {

SHORT           sReal;
    SHORT           sImaginary;

} COMPLEX_COEF, *PCOMPLEX_COEF;
```

2.2.6 CM_HAL_CHARACTERISTICS

After the CM MAC loads the CM HAL library, it calls CmHalDriverEntry(). Inside that function, the CM HAL should call back the CM MAC to register itself with its characteristics. It uses the following data structure to report its characteristics.

```
typedef     struct _CM_HAL_CHARACTERISTICS_ {

USHORT
    usMajorCmMacVersion;
```

```
USHORT
usMinorCmMacVersion;
PFN_CM_HAL_INIT_HANDLER                InitHandler;
PFN_CM_HAL_SCAN_DNSTREAM_CHANNEL_HANDLER
ScanDnstreamChannelHandler;
PFN_CM_HAL_SET_INFO_HANDLER            SetInfoHandler;
PFN_CM_HAL_QUERY_INFO_HANDLER
QueryInfoHandler;
PFN_CM_HAL_SET_MODE_HANDLER            SetModeHandler;
PFN_CM_HAL_QUERY_MODE_HANDLER
QueryModeHandler;
PFN_CM_HAL_RELEASE_MGMT_MSG_HANDLER
ReleaseMgmtMsgHandler;
PFN_CM_HAL_RELEASE_DATA_PACKET_HANDLER
ReleaseDataPacketHandler;
PFN_CM_HAL_SEND_MGMT_MSG_HANDLER
SendMgmtMsgHandler;
       PFN_CM_HAL_SEND_DATA_PACKET_HANDLER
SendDataPacketHandler;

} CM_HAL_CHARACTERISTICS, *PCM_HAL_CHARACTERISTICS;
```

*usMajorCmMacVersion*

Specifies the major version of the CM MAC library the CM HAL is using. The current value is 0x01.

*usMinorCmMacVersion*

Specifies the minor version of the CM MAC library the CM HAL is using. The current value is 0x00.

*InitHandler*

The CM MAC uses this function to initialize the hardware before it begins scanning for downstream frequencies. It is defined as follows.

typedef
    CM_STATUS
    **(\*PFN_CM_HAL_INIT_HANDLER) (**
        VOID );

Refer to the CM HAL section for more details.

*ScanDownChannelHandler*

The CM MAC uses this function for scanning the downstream frequency. It is defined as follows.

typedef
    CM_STATUS
    **(\*PFN_CM_HAL_SCAN_DNSTREAM_CHANNEL_HANDLER) (**
        PDNSTREAM_CHANNEL_PARAMS    pDnstreamChannelParams );

Refer to the CM HAL section for more details.

*SetInfoHandler*

This function is used by the CM MAC to write data onto various hardware registers of the CM. It is defined as follows.

typedef

```
CM_STATUS
(*PFN_CM_HAL_SET_INFO_HANDLER) (
    CM_HAL_OID      cmHALOid,
    ULONG           ulParam,
    PVOID           pvInfoBuffer,
    ULONG           ulInfoBufferLen );
```

Refer to the CM HAL section for more details.

*QueryInfoHandler*

The CM MAC uses this function to read data from various hardware registers of the CM. It is defined as follows.

```
typedef
    CM_STATUS
    (*PFN_CM_HAL_QUERY_INFO_HANDLER) (
        CM_HAL_OID      CmHalOid,
        ULONG           ulParam,
        PVOID           pvInfoBuffer,
        PULONG          pulInfoBufferLen );
```

Refer to the CM HAL section for more details.

*SetModeHandler*

The CM MAC uses this function to set various register modes in the CM hardware. It is defined as follows.

```
typedef
    CM_STATUS
```

```
(*PFN_CM_HAL_SET_MODE_HANDLER) (
    CM_HAL_MODE         CmHalMode,
    ULONG               ulParam,
    BOOLEAN             bflag );
```

Refer to the CM HAL section for more details.

*QueryModeHandler*

This function is used by the CM MAC to query various register modes from the CM hardware. It is defined as follows.

```
typedef
    CM_STATUS
(*PFN_CM_HAL_QUERY_MODE_HANDLER) (
    CM_HAL_MODE         CmHalMode,
    ULONG               ulParam,
    PBOOLEAN            pbflag );
```

Refer to the CM HAL section for more details.

*ReleaseMgmtMsgHandler*

This function is used by the CM MAC to ask the CM HAL to release a management message buffer after it has consumed (processed) it. It is defined as follows.

```
typedef
    VOID
(*PFN_CM_HAL_RELEASE_MGMT_MSG_HANDLER) (
    PMGMT_MSG           pMgmtMsg );
```

Refer to the CM HAL section for more details.

*ReleaseDataPacketHandler*

The CM MAC uses this function to ask the CM HAL to release a data packet buffer after it has consumed it. It is defined as follows.

```
typedef
    VOID
    (*PFN_CM_HAL_RELEASE_DATA_PACKET_HANDLER) (
        PETHERNET_PACKET        pEthernetPacket );
```

Refer to the CM HAL section for more details.

*SendMgmtMsgHandler*

This function is used by the CM MAC to ask the CM HAL to send a management message upstream. It is defined as follows.

```
typedef
    CM_STATUS
    (*PFN_CM_HAL_SEND_MGMT_MSG_HANDLER) (
        PDOCSIS_HDR             pDocsisHdrMgmtMsg,
        USHORT                  usSid,
        PMGMT_MSG               pMgmtMsg );
```

Refer to the CM HAL section for more details.

*SendDataPacketHandler*

This function is used by the CM MAC to ask the CM HAL to send a data packet upstream. It is defined as follows.

```
typedef
    CM_STATUS
    (*PFN_CM_HAL_SEND_DATA_PACKET_HANDLER) (
        PDOCSIS_HDR              pDocsisHdrDataPacket,
        PETHERNET_PACKET         pEthernetPacket,
    USHORT                   usSid,
    UCHAR                    ucTxFlags );
```

The possible values for the ucTxFlags parameter are:

define CM_HAL_UPSTREAM_PACKET_DEFAULT     0x00   // default US Best-Effort packet
define CM_HAL_UPSTREAM_PACKET_CONCAT      0x40   // packet is part of a concatenation sequence
define CM_HAL_UPSTREAM_PACKET_END_CONCAT  0x10   // packet is end of a concatenation sequence
define CM_HAL_UPSTREAM_PACKET_CBR         0x08   // CBR (constant bit rate packet)

Refer to the CM HAL section for more details.

2.2.6 CM_MAC_CHARACTERISTICS

When CM MAC calls the CmHalDriverEntry() of CM HAL, it passes the functions it exports to CM HAL as CM_MAC_CHARACTERISTICS. Its structure is defined as follows:

typedef struct _CM_MAC_CHARACTERISTICS_ {

```
    USHORT
        usMajorVersion;
    USHORT                                                    usMinorVersion;
    PFN_CM_MAC_REGISTER_HANDLER
        RegisterHandler;
    PFN_CM_MAC_INDICATE_MGMT_MSG_HANDLER
        IndicateMgmtMsgHandler;
    PFN_CM_MAC_INDICATE_DATA_PACKET_HANDLER
        IndicateDataPacketHandler;
    PFN_CM_MAC_DATA_PACKET_SEND_COMPLETE_HANDLER
        DataPacketSendCompleteHandler;
    PFN_CM_MAC_INDICATE_STATUS_HANDLER
        IndicateStatusHandler;

} CM_MAC_CHARACTERISTICS, *PCM_MAC_CHARACTERISTICS;
```

*usMajorVersion*

Specifies the current major version of CM MAC that loads CM HAL.

*usMinorVersion*

Specifies the current minor version of CM MAC that loads CM HAL.

*RegisterHandler*

```
    typedef
        CM_STATUS
        (*PFN_CM_MAC_REGISTER_HANDLER) (
            PCM_HAL_CHARACTERISTICS    pCmHalCharacteristics );
```

Refer to the CM MAC section for more details.

*IndicateMgmtMsgHandler*

```
typedef
    VOID
    (*PFN_CM_MAC_INDICATE_MGMT_MSG_HANDLER) (
        PMGMT_MSG                          pMgmtMsg );
```

Refer to the CM MAC section for more details.

*IndicateDataPacketHandler*

```
typedef
    VOID
    (*PFN_CM_MAC_INDICATE_DATA_PACKET_HANDLER) (
        PETHERNET_PACKET                   pEthernetPacket );
```

Refer to the CM MAC section for more details.

*DataPacketSendCompleteHandler*

```
typedef
    VOID
    (*PFN_CM_MAC_DATA_PACKET_SEND_COMPLETE_HANDLER) (
        PETHERNET_PACKET                   pEthernetPacket );
```

Refer to the CM MAC section for more details.

*IndicateStatusHandler*

```
typedef
    VOID
    (*PFN_CM_MAC_INDICATE_STATUS_HANDLER) (
        CM_MAC_OID              CmMacOid,
        ULONG                   ulParam,
        PVOID                   pvStatusBuffer,
        ULONG                   ulStatusBufferLen );
```

Refer to the CM MAC section for more details.

3.    CM HAL

3.1    Description

This section describes the APIs implemented by the CM HAL. According to this embodiment of the invention, the CM HAL driver functions as the Hardware Abstraction Layer for the CM Hardware. CM HAL encapsulates the hardware layer and provides the CM MAC with the capability to control the behavior of the hardware.

The API set consists of the following three functionalities :

- User packet (MAC PDU) handling.

- DOCSIS Management messages handling.

- Hardware Initialization and control.

The CM HAL identifies its characteristics to the CM MAC by using the CM_HAL_CHARACTERISTICS structure (refer to section 2.2.5).

3.2 API

According to this embodiment, all the CM HAL functions return status using the CM_STATUS data type (defined in section 2.1.1).

3.2.1 CmHalDriverEntry

This is the primary entry point for the CM HAL driver, loaded by CM MAC. The CM MAC passes the handlers to the functions it exports to CM HAL through this API.

Syntax:

CM_STATUS
CmHalDriverEntry (
    IN    PCM_MAC_CHARACTERISTICS    pCmMacCharacteristics );

Parameters:

*pCmMacCharacteristics*

Contains functions exported by CM MAC. The CM MAC passes its exported functions using the CM_MAC_CHARACTERISTICS structure (refer to section 2.2.6). The CM HAL has to copy this structure in order to call the CM MAC handlers later.

Return Values:

CM_STATUS_SUCCESS if successful or
CM_STATUS_FAILURE otherwise.

Remarks:

This function must be exported. DriverEntry calls CmMacRegisterHandler() to register its characteristics to the CM MAC driver.

See Also:

CmMacRegisterHandler()

3.2.2 CmHalInitHandler

This is the first function called by the CM MAC after the CM HAL registers its characteristics to the CM MAC. This function lets CM HAL initialize its adapter before it can begin scanning for downstream channels.

Syntax:

CM_STATUS
CmHalInitHandler();

Parameters:

None.

Return Values:

CM_STATUS_SUCCESS if successful,
CM_STATUS_FAILURE if failed.

Remarks:

See Also:

3.2.3 CmHalScanDnstreamChannelHandler

After initializing the hardware using CmHalInitHandler(), the CM MAC starts the DOCSIS initialization procedure. According to this specific embodiment of the invention, the first step in this procedure scans for a valid downstream channel. If the CM MAC already has a valid downstream frequency from a previous operation stored in its non-volatile memory, it provides it as input to this function.

This function first tries to lock onto this downstream frequency. If it is unable to do so, it begins scanning the entire spectrum for any other valid 6 MHz channels. If the CM MAC does not have any valid frequency stored in its non-volatile memory, it provides NULL as input and the function scans the entire spectrum looking for valid 6 MHz downstream channels. Upon completion, it returns the downstream frequency that it locked onto. The CM MAC can store it for future use, or it returns failure if unable to find any valid frequency.

Syntax:

```
CM_STATUS
CmHalScanDnstreamChannelHandler (
    IN OUT   PDNSTREAM_CHANNEL_PARAMS    pDnstreamChannelParams);
```

Parameters:

*pDnstreamChannelparams*

On input, it contains the value of the last valid downstream frequency that the CM has locked onto, if it has stored any in the non-volatile memory or NULL, if not. On return, it contains the downstream frequency that the HAL has finally locked onto. This value is stored by the CM MAC in non-volatile memory for the next operation. The structure of the DNSTREAM_CHANNEL_PARAMETERS is defined in section 2.2.4.

Return Values:

CM_STATUS_SUCCESS if successful,
CM_STATUS_FAILURE if failed.

Remarks:

An indication should be provided to the user that the CM is scanning for downstream channels. For this purpose, CM MAC exports the function CmMacIndicateStatusHandler() that lets CM HAL display its progress.

See Also:

CmMacIndicateStatusHandler()

3.2.4 CmHalSetInfoHandler

This function provides a generic interface that enables CM MAC to write onto various CM hardware registers. This excludes setting register modes (turning on and off specific functionalities of the hardware), which are enabled through CmHalSetModeHandler().

Syntax:

CM_STATUS
CmHalSetInfoHandler (
    IN CM_HAL_OID    cmHalOid,
    IN ULONG    ulParam,
    IN PVOID    pvInfoBuffer,
    IN ULONG    ulInfoBufferLen );

Parameters:

*cmHALOid*

Specifies the hardware object that needs to be set. The CM_HAL_OID values are defined in section 2.1.2.

*ulParam*

If multiple instances of a HAL OID could exist in the hardware, this parameter is used to identify the specific instance being referred to. For example, CM_HAL_OID_DOWNST_DES_SID identifies a downstream DES SID object. But there can be multiple instances of this object as a number of SIDs can be supported by the hardware. In that case, this parameter identifies the specific instance. If the hardware supports 16 downstream SIDs, this parameter could be 0,1,..,15. 0 identifies the $1^{st}$ DES SID register, 1 identifies the $2^{nd}$, and so on.

If there is only one instance of a hardware object, this parameter is set to 0 and is ignored.

*pvInfoBuffer*

Specifies the information to be written

*ulInfoBufferLen*

Specifies the length of the input buffer that needs to be written.

Remarks:

See Also:

CmHalSetModeHandler()

3.2.5 CmHalQueryInfoHandler

This function provides a generic interface that enables CM MAC to query information from the CM hardware. This excludes querying register modes (on/off status of specific functionalities of the hardware), which are enabled through CmHalQueryModeHandler().

Syntax:

```
CM_STATUS
CmHalQueryInfoHandler (
    IN      CM_HAL_OID      cmHALOid,
    IN      ULONG           ulParam,
    OUT     PVOID           pvInfoBuffer,
    IN OUT  PULONG          pulInfoBufferLen );
```

Parameters:

*cmHALOid*

Specifies the hardware object that needs to be queried. The CM_HAL_OID values are defined in section 2.1.2.

*ulParam*

If multiple instances of a HAL OID could exist in the hardware, this parameter is used to identify the specific instance being referred to. For example, CM_HAL_OID_DOWNST_DES_SID identifies a downstream DES SID object. But there can be multiple instances of this object as a number of SIDs can be supported by the hardware. In that case, this parameter identifies the specific instance. If the hardware supports 16 downstream SIDs, this parameter could be 0,1,...,15. 0 identifies the $1^{st}$ DES SID register, 1 identifies the $2^{nd}$ and so on.

If there is only one instance of a hardware object, this parameter is set to 0 and shall be ignored.

*pvInfoBuffer*

Specifies the location where the CM HAL would write the result of the query.

*pulInfoBufferLen*

On input, specifies the length of the buffer allocated by the CM MAC to hold the results. On output, specifies the length of the actual data that was written by the CM HAL.

Remarks:

See Also:

CmHalQueryModeHandler()

3.2.6 CmHalSetModeHandler

This function provides a generic interface that enables CM MAC to set various CM hardware register modes.

Syntax:

CM_STATUS
CmHalSetModeHandler (
　　IN CM_HAL_MODE　　cmHALMode,
　　IN ULONG　　　　　　ulParam,
　　IN BOOLEAN　　　　　bFlag);

Parameters:

*cmHALmode*

Specifies the hardware mode that needs to be set. The CM_HAL_MODE values are defined in section 2.1.3.

*ulParam*

If multiple instances of a HAL OID could exist in the hardware, this parameter is used to identify the specific instance being referred to. For example CM_HAL_OID_DOWNST_DES_SID identifies a downstream DES SID object. But there can be multiple instances of this object as a number of SIDs can be supported by the hardware. In that case, this parameter identifies the specific instance. If the hardware supports 16 downstream SIDs, this parameter could be 0,1,...,15. 0 identifies the $1^{st}$ DES SID register, 1 identifies the $2^{nd}$ and so on.

If there is only one instance of a hardware object, this parameter is set to 0 and shall be ignored.

*bFlag*

Specifies whether the particular mode needs to be turned on/off:
TRUE (= 1) implies turn on, and
FALSE (= 0) implies turn off.

Remarks:

See Also:

CmHalSetInfoHandler()

3.2.7 CmHalQueryModeHandler

Syntax:

CM_STATUS
CmHalQueryModeHandler (
    IN CM_HAL_MODE   cmHalMode,
    IN ULONG             ulParam, OUT    PBOOLEAN    pbFlag);

Parameters:

*cmHalmode*

Specifies the hardware mode that needs to be set. The CM_HAL_MODE values are defined in section 2.1.3.

*ulParam*

If multiple instances of a HAL OID could exist in the hardware, this parameter is used to identify the specific instance being referred to. For example, CM_HAL_OID_DOWNST_DES_SID identifies a downstream DES SID object. But there can be multiple instances of this object as anumber of SIDs can be supported by the hardware. In that case, this parameter identifies the specific instance. If the hardware supports 16 downstream SIDs, this parameter could be 0,1,..,15. 0 identifies the $1^{st}$ DES SID register, 1 identifies the $2^{nd}$ and so on.

If there is only one instance of a hardware object, this parameter is set to 0 and shall be ignored.

*pbFlag*

On return, flag indicates whether the particular mode is currently on/off.
TRUE (= 1) implies turn on, and
FALSE (= 0) implies turn off.

Remarks:

See Also:

CmHalQueryInfoHandler()

3.2.8 CmHalReleaseMgmtMsgHandler

This function is used by CM MAC to let the CM HAL know that it has "consumed" the Management message it received. The CM HAL can release the buffer descriptors used to store the management message. The CM HAL indicates to CM MAC with the CmMacIndicateMgmtMsg () function on receipt of a management message.

Syntax:

**VOID
CmHalReleaseMgmtMsgHandler(**
    IN    PMGMT_MSG    pMgmtMsg);

Parameters:

*pMgmtMsg*

Pointer to the Management message that has been consumed by the CM MAC. The MGMT_MSG structure is defined in section 2.2.1.

Return Values:

None.

Remarks:

See Also:

CmMacIndicateMgmtMsgHandler()

3.2.9 CmHalReleaseDataPacketHandler

This function is used by CM MAC to let the CM HAL know that it has "consumed" the Ethernet packet (MAC PDU) it received. The CM HAL can release the buffer descriptors used to store the data packet. The CM HAL indicates to CM MAC via CmMacIndicateDataPacket () function on receiving a MAC data packet.

Syntax:

```
VOID
CmHalReleaseDataPacketHandler(
        IN      PETHERNET_PACKET    pEthernetPacket);
```

Parameters:

*pEthernetPacket*

Pointer to Ethernet packet that has been consumed by the CM MAC. The ETHERNET_PACKET structure is defined in section 2.2.2.

Return Values:

None

Remarks:

See Also:

CmMacIndicateDataPacketHandler()

3.2.10 CmHalSendMgmtMsgHandler

This function is called when the CM MAC has a DOCSIS management message packet to send upstream to the CMTS.

Syntax:

```
CM_STATUS
CmHalSendMgmtMsgHandler(
    IN    PDOCSIS_HEADER      pDocsisHeader,
    IN    USHORT              usSid,
    IN    PMGMT_MSG           pMgmtMsg);
```

Parameters:

*pDocsisHeader*

Pointer to the DOCSIS header to be sent out with this packet. The DOCSIS Header structure is defined in section 2.2.3.

*usSid*

The SID on which the management message is to be sent. This is always the primary SID obtained from the CMTS.

*pMgmtMsg*

Pointer to MGMT_MSG structure that should have all fields completed. Since speed is not as critical for Management messages as it is for data PDUs, this function will not return until the message has been successfully sent(i.e.,) the hardware obtains an interrupt indicating that the whole message has been transmitted. The MGMT_MSG structure is defined in section 2.2.1.

Return Values:

CM_STATUS_SUCCESS if successful,
CM_STATUS_FAILURE if failed.

Remarks:

See Also:

3.2.11 CmHalSendDataPacketHandler

This function is called when the CM MAC has an Ethernet packet (MAC PDU) to send upstream to the CMTS.

Syntax:

CM_STATUS
CmHalSendDataPacketHandler(
      IN    PDOCSIS_HEADER         pDocsisHeader,
      IN    PETHERNET_PACKET   pEthernetPacket,
      IN USHORT                    usSid,
      IN UCHAR                     ucTxFlags);

Parameters:

*pDocsisHeader*

Pointer to DOCSIS header to be sent out with this packet. The DOCSIS Header structure is defined in section 2.2.3.

*pEthernetPacket*

Points to ETHERNET_PACKET structure that should have all fields completed. Since speed is a very critical issue for data PDUs, this function will return immediately to the caller. Later, when the CM HAL knows that the whole packet has been transmitted (by obtaining the corresponding hardware interrupt), it indicates it to the CM MAC using the CmMacDataPacketSendCompleteHandler() function . The Ethernet Packet structure is defined in section 2.2.2.

*usSid*

The SID on which the data packet is to be transmitted. The SIDs are obtained after registration.

*ucTxFlags*

The upstream Transmit Flags if any.

Return Values:

CM_STATUS_SUCCESS if successful,
CM_STATUS_FAILURE if failed.

Remarks:

See Also:

CmMacDataPacketSendCompleteHandler().

4. CM MAC

4.1 Description:

The CM MAC library consists of three components:

- MAC Agent, which manages the sending and receiving of all the MAC management messages to and from the MAC Management and BPI modules, and the MAC data packets to and from the IP,

- MAC Management, which handles all the MAC Management messages (except the BP related ones). It implements the core of the DOCSIS MAC layer
- BPI, which perform the DOCSIS Baseline Privacy Key Management. It also provides the BP extended header for the upstream MAC data packets.

The APIs defined in the next section only correspond to the functions that the CM MAC exports to the CM HAL when calling the CmHalDriverEntry() function using the CM_MAC_CHARACTERISTICS structure (defined in section 2.2.6).

4.2 API

The CM MAC functions use the data type CM_STATUS (defined in section 2.1.1) for returning status.

4.2.1 CmMacRegisterHandler

The CM HAL uses this function to register to the CM MAC and to inform it of all the functions that it exports according to this embodiment of the invention.

Syntax:

CM_STATUS
CmMacRegisterHandler (
    IN    PCM_HAL_CHARACTERISTICS    pCmHalCharacteristics);

Parameters:

*pCmHalCharacteristics*

Pointer to the CM_HAL_CHARACTERISTICS structure setup by the CM HAL. It includes the CM HAL functions that it exports to the CM MAC. The structure of the CM_HAL_CHARACTERISTICS is defined in section 2.2.5.

*uiCharacteristicsLength*

Specifies the length of the CM HAL supplied characteristics buffer. Depending on the value of ucMajorCmMacVersion, this parameter must be the size of(CM_HAL_CHARACTERISTICS).

Return Value:

CM_STATUS_SUCCESS if the CM HAL registration is successful,

CM_STATUS_BAD_CHARACTERISTICS if the uiCharacteristicsLength is less thanthe ucMajorCmMacVersion specified, CM_STATUS_BAD_VERSION if the ucMajorCmMacVersion OR ucMinorCmMacVersion specified in the characteristics structure is not valid, CM_STATUS_RESOURCES if a shortage of resources, possibly memory, prevented the CM MAC library from registering the CM HAL, or CM_STATUS_FAILURE if there is any other error.

Remarks:

The CM HAL calls CmMacRegisterHandler() from theCmHalDriverEntry() function. It sets up the CM HAL Characteristics structure containing all the functions that it exports.

The CM MAC then copies this structure to its internal storage. Once it has registered, a CM HAL cannot change its handler functions.

The CM HAL must have the CmHalInitHandler() as one of the functions in the characteristics structure.CmHal After calling CmMacRegisterHandler(), the CM HAL is prepared to receive a call from the CM MAC to CmHalInitHandler().

See Also:

CmHalDriverEntry(), CmHalInitHandler()

4.2.2 CmMacIndicateMgmtMsgHandler

When the CM HAL receives a DOCSIS Management message, it uses this function to inform the CM MAC. This function will only queue the messages up for its clients (BP and MAC Mgmt modules) and return immediately. After the Management message has been consumed, the CM MAC lets the CM HAL know using the CmHalReleaseMgmtMsgHandler() function.

Syntax

VOID
CmMacIndicateMgmtMsgHandler(
    IN    PMGMT_MSG    pMgmtMsg);

Parameters:

*pMgmtMsg*

Pointer to the DOCSIS Management message data structure that is returned to the CM HAL by CmHalReleaseMgmtMsgHandler() when the packet is consumed. The MGMT_MSG structure is defined in section 2.2.1.

Return Values

None.

Remarks

CM MAC is expected to call CmHalReleaseMgmtMsgHandler(), passing back the MGMT_MSG pointer when the packet has been consumed.

See Also

CmHalReleaseMgmtMsgHandler()

4.2.3 CmMacIndicateDataPacketHandler

When the CM HAL receives an Ethernet packet (MAC PDU) according to this embodiment of the invention, it uses this function to inform the CM MAC This function only queues up the packet and return immediately. When the CM HAL completes receiving data packets, it indicates the CM MAC by calling this function with the Ethernet packet pointer set to NULL. The NULL value informs the CM MAC that there are no more data packets and only then, the CM MAC would indicate its upper layer to begin consuming the packets. After the packet has been consumed, the CM MAC lets the HAL know using CmHalReleaseDataPacketHandler() function.

Syntax:

VOID
CmMacIndicateDataPacketHandler (
    IN    PETHERNET_PACKET    pEthernetPacket);

Parameters:

*pEthernetPacket*

Pointer to the Ethernet packet data structure that is returned to the CM HAL via CmHalReleaseDataPacketHandler() when the packet is consumed. This pointer is set to NULL to indicate the CM MAC that the CM HAL has completed receiving data packets. The ETHERNET_PACKET structure is defined in section 2.2.2.

Return Values:

None.

Remarks:

See Also:

CmHalReleaseDataPacketHandler()

4.2.4 CmMacDataPacketSendCompleteHandler

When CM HAL is requested to send a data packet by the CM MAC, CM HAL uses this function to inform the CM MAC that the packet has been successfully sent.

Syntax:

VOID
CmMacDataPacketSendCompleteHandler(
    IN PETHERNET_PACKET    pEthernetPacket);

Parameters:

*pEthernetPacket*

Pointer to the Ethernet packet data structure that the CM MAC passed in when it called CmHalSendDataPacketHandler().

Return Values:

None.

Remarks:

See Also:

CmHalSendDataPacketHandler()

4.2.5 CmMacIndicateStatusHandler

The CM HAL uses this function to feedback any reportable condition to the CM MAC. The CM_MAC_OID values defined in section 2.1.4 are used to report the status of various operations.

For example, it is expected that during downstream channel scanning, the CM HAL may encounter delay. In that case, the CM HAL can use this function to give feedback to the user.

Syntax:

VOID
CmMacIndicateStatus(
  IN CM_MAC_OID  cmMacOid,
  IN ULONG  ulParam,
  IN PVOID  pvStatusBuffer,
  IN ULONG  ulStatusBufferLen );

Parameters:

*cmMacOid*

Specifies the operation whose status is indicated

*ulParam*

If multiple instances of a CM_MAC_OID could exist, this is used to identify the specific instance. If there is only instance, this value is set to 0 and shall be ignored.

*pvStatusBuffer*

Pointer to the buffer containing the data reported as part of indicating status. For example, this could contain the current downstream channel being scanned in case of CM_MAC_OID_DOWNST_SCAN.

*ulStatusBufferLen*

Length of the status data buffer.

Return Values:

None.

Remarks:

See Also:

CmHalScanDownChannelHandler()

What is claimed is:

1. A customer premises equipment, capable of connecting with a cable network, the customer premises equipment comprising:
- a cable modem for receiving and sending data packets over the cable network;
- a media access controller software layer that controls the physical behavior of the cable modem; and
- a hardware abstraction layer, between the cable modem and the media access controller, with an application program interface that abstracts hardware specific control of the cable modem to the media access controller in order to separate non-uniform cable modem hardware from standardized media access controller software.

2. A customer premises equipment as defined in claim 1, wherein the interface further comprises computer executable instructions for registering the interface with the media access control.

3. A customer premises equipment as defined in claim 1, wherein the interface further comprises computer executable instructions for initializing the cable modem for communication.

4. A customer premises equipment as defined in claim 1, wherein the interface further comprises computer executable instructions for scanning for a valid frequency.

5. A customer premises equipment as defined in claim 1, wherein the interface further comprises computer executable instructions for determining the capabilities, by the media access controller, of the cable modem.

6. A customer premises equipment as defined in claim 1, wherein the interface further comprises computer executable instructions for writing to registers of the cable modem.

7. A customer premises equipment as defined in claim 1, wherein the interface further comprises computer executable instructions for querying the cable modem for status information.

8. A customer premises equipment as defined in claim 1, wherein the interface further comprises computer executable instructions for setting modes of the cable modem.

9. A customer premises equipment as defined in claim 1, wherein the interface further comprises computer executable instructions for releasing a cable modem management packet from memory.

10. A customer premises equipment as defined in claim 1, wherein the interface further comprises computer executable instructions for releasing a user data packet from memory.

11. A customer premises equipment as defined in claim 1, wherein the interface further comprises computer executable instructions for sending a cable modem management data packet upstream.

12. A customer premises equipment as defined in claim 1, wherein the interface further comprises computer executable instructions for sending a user data packet upstream.

13. A customer premises equipment as defined in claim 1, wherein the interface further comprises computer executable instructions for sending a cable modem management packet to the media access controller.

14. A customer premises equipment as defined in claim 1, wherein the interface further comprises computer executable instructions for forwarding a user data packet.

15. A customer premises equipment as defined in claim 1, wherein the cable modem is integrated with the customer premises equipment.

16. In a system having a host computer integrated with a cable modem, a method for controlling the cable modem with a media access controller included in the host computer, the method comprising the steps of:
- registering a hardware abstraction interface, between the cable modem and the media access controller, with the media access controller;
- providing, by the hardware abstraction interface, functions that abstract hardware specific control of the cable modem to the media access controller so as to keep hardware specific control of the cable modem separate from the media access controller; and
- controlling, by the media access controller, the cable modem with the functions provided by the interface.

17. A method as defined in claim 16, wherein the step of controlling the cable modem further comprises the step of initializing the cable modem.

18. A method as defined in claim 16, wherein the step of controlling the cable modem further comprises the step of scanning for a downstream frequency.

19. A method as defined in claim 16, wherein the step of controlling the cable modem further comprises the step of writing to registers of the cable modem.

20. A method as defined in claim 16, wherein the step of controlling the cable modem further comprises the step of determining the capabilities of the cable modem.

21. A method as defined in claim 16, wherein the step of controlling the cable modem further comprises the step of determining the mode of the cable modem.

22. A method as defined in claim 16, wherein the step of controlling the cable modem further comprises the step of sending a management data packet upstream.

23. A method as defined in claim 16, wherein the step of controlling the cable modem further comprises the step of sending a data user packet upstream.

24. A method as defined in claim 16, wherein the step of controlling the cable modem further comprises the step of releasing from memory consumed data packets.

25. In a system having a host computer integrated with a cable modem, a method for integrating the cable modem with a media access controller included in the host computer, the method comprising the steps of:
- calling, by the media access controller, a function of an interface between the media access controller and the cable modem that abstracts hardware specific control of the cable modem to the media access controller in order to separate any hardware specific control of the cable modem from the media access controller, the function having one or more parameters; and
- executing the function by the interface.

26. A method as in claim 25, wherein the function comprises a CmHalDriverEntry function that registers the interface with the media access controller, and wherein the one or more parameters comprise a CmMacCharacteristics parameter that passes one or more functions being exported by the media access controller.

27. A method as in claim 25, wherein the function comprises a CmHalInitHandler function that initializes an adapter within the interface for network communication.

28. A method as in claim 25, wherein the function comprises a CmHalScanDSChannelHandler function that scans for a valid downstream frequency to use for communication, and wherein the one or more parameters comprise a pDSChannelParams parameter that on input contains a last valid downstream frequency locked onto by the cable modem, and on return, a potentially different downstream frequency that the interface locked onto while the CmHalScanDSChannelHandler function scans for a valid downstream frequency.

29. A method as in claim 25, wherein the function comprises a CMHalSetInfoHandler function that permits the media access controller to write one or more cable modem hardware registers, and wherein the one or more parameters comprise an Oid parameter that specifies a hardware object to set, a Param parameter that identifies a specific instance of the hardware object if multiple instances could exist in hardware, an InfoBuffer parameter that specifies information to be written, and an InfoBufferLen parameter that specifies a length of the InfoBuffer parameter.

30. A method as in claim 25, wherein the function comprises a CMHalQueryInfoHandler function that allows the media access controller to query information from the cable modem, and wherein the one or more parameters comprise an Oid parameter that specifies a hardware object to query, a Param parameter that identifies a specific instance of the hardware object if multiple instances could exist in hardware, an InfoBuffer parameter that specifies a location to write a result of the query, and an InfoBufferLen parameter that specifies a length of information written to the InfoBuffer.

31. A method as in claim 25, wherein the function comprises a CmHalSetModeHandler function that permits the media access controller to write one or more cable modem hardware registers and to set a mode of operation for the cable modem, and wherein the one or more parameters comprise a Mode parameter that specifies the mode of operation for the cable modem that needs to be set, a Param parameter that identifies a specific instance of a hardware object if multiple instances could exist in hardware, and a Flag parameter that specifies whether the mode of operation for the cable modem should be turned on or turned off.

32. A method as in claim 25, wherein the function comprises a CmHalQueryModeHandler function that allows the media access controller to query the cable modem for the cable modem's mode of operation, and wherein the one or more parameters comprise a Mode parameter that specifies the mode of operation for the cable modem to be queried, a Param parameter that identifies a specific instance of a hardware object if multiple instances could exist in hardware, and a Flag parameter that indicates whether the mode of operation for the cable modem is currently turned on or turned off.

33. A method as in claim 25, wherein the function comprises a CmHalReleaseMgmtMsgHandler function that informs the interface that a particular management data packet has been consumed by the media access controller and can be released from storage, and wherein the one or more parameters comprise a pMgmtMsg parameter that points to the particular management data packet that has been consumed by the media access controller.

34. A method as in claim 25, wherein the function comprises a CmHalReleaseDataPacketHandler function that informs the interface that a particular user data packet has been consumed and can be released from storage, and wherein the one or more parameters comprise a pEthernetPacket parameter that identifies the particular user data packet that has been consumed.

35. A method as in claim 25, wherein the function comprises a CmHalSendMgmtMsgHandler function that sends a management data packet upstream within a network, and wherein the one or more parameters comprise a pDocsisHeader parameter that identifies a protocol header to be sent with the management data packet, a SID parameter indicating the SID on which the management data packet is to be sent, and a pMgmtMsg parameter that identifies information to be sent in the management data packet.

36. A method as in claim 25, wherein the function comprises a CmHalSendDataPacketHandler function that sends a user data packet upstream within a network, and wherein the one or more parameters comprise a pDocsisHeader parameter that identifies a protocol header to be sent with the management data packet, a pEthernetPacket parameter that identifies information to be sent in the user data packet, a SID parameter indicating the SID on which the data packet is to be transmitted, and a TxFlags parameter that includes any upstream transmit flags.

37. A computer program product for implementing, in a system having a cable modem integrated with a host computer, a method for controlling the cable modem with a media access controller included in the host computer, the computer program product comprising:
  a computer-readable medium carrying computer-executable instructions for implementing the method, wherein the computer-executable instructions comprise program code means for:
    calling, by the media access controller, a function of an interface between the media access controller and the cable modem that abstracts hardware specific control of the cable modem to the media access controller in order to separate any hardware specific control of the cable modem from the media access controller, the functions having one or more parameters;
    executing the function by the interface.

38. A computer program product as in claim 37, wherein the function comprises a CmHalDriverEntry function that registers the interface with the media access controller, and wherein the one or more parameters comprise a CmMacCharacteristics parameter that passes one or more functions being exported by the media access controller.

39. A computer program product as in claim 37, wherein the function comprises a CmHalInitHandler function that initializes an adapter within the interface for network communication.

40. A computer program product as in claim 37, wherein the function comprises a CmHalScanDSChannelHandler function that scans for a valid downstream frequency to use for communication, and wherein the one or more parameters comprise a pDSChannelParams parameter that on input contains a last valid downstream frequency locked onto by the cable modem, and on return, a potentially different downstream frequency that the interface locked onto while the CmHalScanDSChannelHanlder function scans for a valid downstream frequency.

41. A computer program product as in claim 37, wherein the function comprises a CmHalSetInfoHandler function that permits the media access controller to write one or more cable modem hardware registers, and wherein the one or more parameters comprise an Oid parameter that specifies a hardware object to set, a Param parameter that identifies a specific instance of the hardware object if multiple instances could exist in hardware, an InfoBuffer parameter that specifies information to be written, and an InfoBufferLen parameter that specifies a length of the InfoBuffer paramter.

42. A computer program product as in claim 37, wherein the function comprises a CmHalQueryInfoHandler function that allows the media access controller to query information from the cable modem, and wherein the one or more parameters comprise an Oid parameter that specifies a hardware object to query, a Param parameter that identifies a specific instance of the hardware object if multiple instances could exist in hardware, an InfoBuffer parameter that specifies a location to write a result of the query, and an InfoBufferLen parameter that specifies a length of information written to the InfoBuffer.

43. A computer program product as in claim 37, wherein the function comprises a CmHalSetModeHandler function that permits the media access controller to write one or more cable modem hardware registers and to set a mode of operation for the cable modem, and wherein the one or more parameters comprise a Mode parameter that specifies the mode of operation for the cable modem that needs to be set, a Param parameter that identifies a specific instance of the hardware object if multiple instances could exist in hardware, and a Flag parameter that specifies whether the mode of operation for the cable modem should be turned on or turned off.

44. A computer program product as in claim 37, wherein the function comprises a CmHalQueryModeHandler function that allows the media access controller to query the cable modem for the cable modem's mode of operation, and wherein the one or more parameters comprise a Mode parameter that specifies the mode of operation for the cable modem to be queried, a Param parameter that identifies a specific instance of the hardware object if multiple instances could exist in hardware, and a Flag parameter that that indicates whether the mode of operation for the cable modem is currently turned on or turned off.

45. A computer program product as in claim 37, wherein the function comprises a CmHalReleaseMgmtMsgHandler function that informs the interface that a particular management data packet has been consumed by the media access controller and can be released from storage, and wherein the one or more parameters comprise pMgmtMsg parameter that that points to the particular management data packet that has been consumed by the media access controller.

46. A computer program product as in claim 37, wherein the function comprises a CmHalReleaseDataPacketHandler function that informs the interface that a particular user data packet has been consumed and can be released from storage, and wherein the one or more parameters comprise a pEthemetPacket parameter that identifies the particular user data packet that has been consumed.

47. A computer program product as in claim 37, wherein the function comprises a CmHalSendMgmtMsgHandler function that sends a management data packet upstream within a network, and wherein the one or more parameters comprise a pDocsisHeader parameter that identifies a protocol header to be sent with the management data packet, a SID parameter indicating the SID on which the management data packet is to be sent, and a pMgmtMsg parameter that identifies information to be sent in the management data packet.

48. A computer program product as in claim 37, wherein the function comprises a CmHalSendDataPacketHandler function that sends a user data packet upstream within a network, and wherein the one or more parameters comprise a pDocsisHeader parameter that identifies a protocol header to be sent with the management data packet, a pEthernetPacket parameter that identifies information to be sent in the user data packet, a SID parameter indicating the SID on which the data packet is to be transmitted, and a TxFlags parameter that includes any upstream transmit flags.

\* \* \* \* \*